US006592460B2

(12) United States Patent
Torango

(10) Patent No.: US 6,592,460 B2
(45) Date of Patent: Jul. 15, 2003

(54) PROGRESSIVE WAGERING SYSTEM

(76) Inventor: Lawrence J. Torango, 2240 Idlewild Dr., Reno, NV (US) 89509

(*) Notice: Subject to any disclaimer, the term of this patent is extended or adjusted under 35 U.S.C. 154(b) by 0 days.

(21) Appl. No.: 09/875,467

(22) Filed: Jun. 5, 2001

(65) Prior Publication Data

US 2002/0042297 A1 Apr. 11, 2002

Related U.S. Application Data

(63) Continuation of application No. 09/698,941, filed on Oct. 27, 2000, now Pat. No. 6,435,968, and a continuation of application No. 09/005,341, filed on Jan. 9, 1998, now Pat. No. 6,241,608.

(60) Provisional application No. 60/035,513, filed on Jan. 15, 1998, provisional application No. 60/040,982, filed on Mar. 17, 1997, and provisional application No. 60/050,971, filed on Jun. 19, 1997.

(51) Int. Cl.[7] ................................................ A63F 13/00

(52) U.S. Cl. ........................................................ 463/27

(58) Field of Search ......................... 463/12–13, 16–31, 463/39, 40–43; 273/274, 293, 143 R, 309, 410

(56) References Cited

U.S. PATENT DOCUMENTS 5,564,700 A * 10/1996 Celona ........................ 463/27
5,626,341 A * 5/1997 Jones et al. ................. 273/292
5,766,076 A * 6/1998 Pease et al. .................. 463/27
5,788,573 A * 8/1998 Baerlocher et al. ........... 463/16

* cited by examiner

Primary Examiner—Kim Nguyen
(74) Attorney, Agent, or Firm—Ian F. Burns

(57) ABSTRACT

A linked progressive gaming system and method of operation is disclosed that is capable of accepting wagers in different currencies and different denominations of the same currency and allowing players in diverse locations to play for common progressive prizes. The system periodically computes each current prize value using the data acquired from each gaming device, and displays the values at each location where participating gaming devices are located, in the currency used at each particular location. Multiple prizes may be supported simultaneously. Each gaming device may be linked to one or more prizes. Progressive prize award events may be triggered by random events associated with play based on wagers made on gaming devices or by the central system based on prize criteria exceeding a boundary limit. A Free Play apparatus is disclosed that allows non-progressive gaming devices, as well as other traditional games, to participate in progressive play.

17 Claims, 15 Drawing Sheets

Figure 9

| | NEW GAME METERS 901 | | CHANGE 902 | PRIOR GAME METERS 903 |
|---|---|---|---|---|
| GAMING DEVICE ID | 732 | 9011 | | |
| GAME NUMBER | 1 | 9012 | | |
| BUSINESS DAY | 19970306 | | | |
| BIG JACKPOT WIN NUMBER | 528 | 9014 | | |
| LITTLE JACKPOT WIN NUMBER | 1497 | 9015 | | |
| CURRENCY | CANADA | 9016 | | |
| GAMES PLAYED | 1,400 | | 2 | 1,398 |
| GAMES WON | 1,124 | | 1 | 1,123 |
| WAGERS MADE | 5,246.25 | | 3.00 9023 | 5,243.25 |
| WINNINGS | 4,978.75 | | 2.25 | 4,976.50 |

PROGRESSIVE PRIZE AND GAME PAY LINE LINKAGE 904

| PRIZE | GAMING DEVICE | GAME NUMBER | PAY LINE | SURCHARGE PERCENT |
|---|---|---|---|---|
| BIG JACKPOT | 732 | 1 | 1 | .00000415979493 90451 |
| LITTLE JACKPOT | 732 | 1 | 2 | 0 90452 |

ACCUMULATED WAGERS FOR BIG JACKPOT 528 905A

| CURRENCY | SURCHARGE PERCENT | WAGERS |
|---|---|---|
| CANADA | 0 | 1,287,560.15 |
| CANADA | .00000415979493 | 1,178,368.10 + 3.00 = 1,178,371.10 9052A |
| US | 0 | 1,877,698.05 |
| MEXICO | 0 | 8,295,223.00 |

ACCUMULATED WAGERS FOR LITTLE JACKPOT 1497 905B

| CURRENCY | SURCHARGE PERCENT | WAGERS |
|---|---|---|
| CANADA | 0 | 329,736.00 + 3.00 = 329,739.00 9052B |
| US | 0 | 199.248.25 |
| MEXICO | 0 | 722,965.00 |

Figure 10

ACCUMULATED WAGERS FOR BIG JACKPOT 528 — 1001

| | BEFORE | | AFTER — 1005 | |
|---|---|---|---|---|
| CANADA | 0 | 1,287,560.15 | 0 | 0.00 |
| CANADA | .00000415979493 | 1,178,371.10 | -.000022941158344 | 0.00 |
| US | 0 | 1,877,698.05 | 0 | 0.00 |
| MEXICO | 0 | 8,295,223.00 | 0 | 0.00 |

CONVERSION OF ACCUMULATED WAGES TO PRIOR INCREMENT — 1002

| | |
|---|---|
| CANADA | (1,287.560.15 * .7471 ) * (.02 + 0 ) = 19,238.72 |
| CANADA | (1,178,371.10 * .7471 ) * (.02 + .00000415979493 ) = 17,610.88 |
| US | (1,877,698.05 * 1 ) * (.02 + 0 ) = 37,553.96 |
| MEXICO | (8,295,223.00 * .126759 ) * (.02 + 0 ) = 21,029.88 |
| | 95,433.44 — 1003 |

BIG JACKPOT CONTROL DATA

| | BEFORE | AFTER |
|---|---|---|
| CURRENCY | US | US |
| MINIMUM PRIZE AMOUNT | 1,000,000 | 1,000,000 |
| PRIOR INCREMENT | 0.00 | 95,433.44 — 1004 |
| INCREMENT PERCENT | .02(2%) | .015(1.5%) |

EXCHANGE RATES

BEFORE

| FROM \ TO | CANADA | US | MEXICO |
|---|---|---|---|
| CANADA | 1 | .7471 | |
| US | 1.3361 | 1 | 7.8980 |
| MEXICO | | .126759 | 1 |

AFTER — 1006

| FROM \ TO | CANADA | US | MEXICO |
|---|---|---|---|
| CANADA | 1 | .7484 | |
| US | 1.3385 | 1 | 7.8890 |
| MEXICO | | .126612 | 1 |

Figure 11

| BIG JACKPOT CONTROL DATA | | | COMPUTE BIG JACKPOT CURRENT PRIZE VALUE |
|---|---|---|---|
| CURRENCY | US | | |
| MINIMUM PRIZE AMOUNT | 1,000,000 | 1101 | 1,000,000.00 |
| PRIOR INCREMENT | 95,433,44 | 1102 | 95,433.44 |
| INCREMENT PERCENT | .015(1.5%) | 1106 | 42,606.38 |
| | | 1107 | 1,138,039.82 |

ACCUMULATED WAGERS FOR BIG JACKPOT 1103

| | | |
|---|---|---|
| CANADA | 0 | 643,982.35 |
| CANADA | -.000022941158344 | 712,747.40 |
| US | 0 | 1,003,816.55 |
| MEXICO | 0 | 6,492,650.00 |

CONVERSION OF ACCUMULATED WAGERS TO CURRENT INCREMENT 1104

CANADA ( 643,982.35 * .7484 ) * ( .015 + 0 ) = 7,229.35

CANADA ( 712,747.40 * .7484 ) * ( .015 + -.000022941158344 ) = 7,989.07

US ( 1,003,816.55 * 1 ) * ( .015 + 0 ) = 15,057.25

MEXICO ( 6,492,650.00 * .126612 ) * ( .015 + 0 ) = 12,330.71

42,606.38 (1106)

EXCHANGE RATES 1105

| FROM \ TO | CANADA | US | MEXICO |
|---|---|---|---|
| CANADA | 1 | .7484 | |
| US | 1.3385 | 1 | 7.8890 |
| MEXICO | | .126612 | 1 |

1206

CONVERSION OF PRIZE VALUE INTO WAGER CURRENCIES

| | | | |
|---|---|---|---|
| CANADA | ( 1,138,039.82 * 1.3385 ) | = | 1,523,266.30 |
| US | ( 1,138,039.82 * 1 ) | = | 1,138,039.82 |
| MEXICO | ( 1,138,039.82 * 7.8890 ) | = | 8,977,996.14 |

Figure 15

| PAY LINE | WIN CRITERIA | ODDS | WIN AMOUNT FOR COIN REQUIRED 1 COIN | 2 COINS | 3 COINS | SP |
|---|---|---|---|---|---|---|
| 1 | AAA | 10,000,000:1 | 2,500 | 5,000 | 7,500 | YES |
| 2 | BBB | 1.000,000:1 | 250 | 500 | 750 | YES |
| 3 | CCC | 500,000:1 | 125 | 250 | 375 | NO |
| 4 | DDD | 100,00:1 | 25 | 50 | 75 | NO |
| 10 | JJJ | 3:1 | 2 | 4 | 6 | NO |

DESCRIPTION OF PRIOR ART

PROGRESSIVE WAGERING SYSTEM

CROSS REFERENCES TO RELATED APPLICATIONS

This application is a continuation of U.S. patent application Ser. No. 09/698,941, filed on Oct. 27, 2000, now U.S. Pat. No. 6,435,968, and/or a continuation of Ser. No. 09/005,341, filed on Jan. 9, 1998, now U.S. Pat. No. 6,241,608, which claims priority of U.S. provisional patent application Nos. 60/035/513, filed on Jan. 15, 1997, 60/040/982, filed on Mar. 17, 1997, and 60/050/971, filed on Jun. 19, 1997.

BACKGROUND OF THE INVENTION

1. Field of Invention

This invention relates to a computerized control processes executed on one or more central computers and one or more remote computers. The control processes manage progressive gaming in which a plurality of progressive prizes may be linked to a plurality of gaming device's progressive game pay lines. This invention may include Free Play apparatus to allow linkage between the plurality of progressive prizes with gaming devices devoid of progressive game play line logic. The gaming devices may accept wagers using different currencies and different denominations within a particular currency while participating in common prizes.

2. Description of Related Art

Each of the prior art progressive gaming systems and methods have common properties due to the regulatory environment, characteristics of the gaming industry and the events related to progressive processes.

Regulatory agencies have at least four primary concerns related to progressive control systems, in addition to the common and normal regulations concerning gaming activities.

1. The control system must ensure that every game linked to a progressive prize requires the same total wager amount to be made by players over the theoretical life cycle of one prize
2. The portion of wagers contributed to increment the prize value, fund starting prize values, etc. must be the same for each wager made.
3. The controlling system must provide a reasonable degree of protection against system error or tampering resulting in prize awards.
4. Business functionality must be capable of producing reports that provide an audit of the control system processes and ensure wagers made by players have been accounted for correctly.

Prior art gaming devices typically contain one or more games that can be played for various prizes. Each game has a pay table that defines all possible outcomes of one play of the game that can result in awarding a prize to a player. Gaming devices used for wagering are usually approved for play based on theoretical pay out. For example, the REGULATIONS OF THE NEVADA GAMING COMMISSION AND STATE GAMING CONTROL BOARD current as of March, 1997, section 14.040 states that "All gaming devices submitted for approval: 1. Must theoretically pay out a mathematically demonstrable percentage of all amounts wagered, which must not be less than 75 percent for each wager available for play on the device.".

Theoretical pay out is mathematically demonstrated using the game's pay table to compute the difference between the total monetary amount of wagers made over a theoretically time period and the prizes awarded. In prior art games, each line of the pay table defines the number of coins required to be played, the criteria that defines a win, the odds of the win criteria resulting from one play of the game and the number of coins returned by the gaming device to the player when a win is registered. In addition, a pay line may include the ability to accept a progressive prize value from the system. In prior art progressive gaming systems and methods this is required to allow the game's pay line to be linked to a system controlled progressive prize.

One representation of a prior art game's pay table is illustrated in FIG. 15. In this representation there are 10 possible combinations of symbols, represented as AAA through JJJ, that will result in awarding a prize to the player. For simplicity pay lines 5 through 9 are not shown. Each pay line will return a number of coins determined by the coins bet, as indicated in FIG. 15 as win amount for coin required, in which case the coins required are 1, 2 or 3. In the event 3 coins are required, then the pay line may also be linked to a system progressive prize, indicated by SP. In FIG. 15 pay lines 1 and 2 must be linked to a system progressive prize before the game may be played.

The pay table for one embodiment of a gaming machine with a dynamic pay schedule is illustrated in U.S. Pat. No. 5,123,649.

The control processes of most of the prior art progressive gaming systems and methods include games with a single progressive pay line. Each participating game accepts wagers only with coins of the same denomination and of the same currency. For example, if the progressive prize is based on a $1.00 U.S. denomination, all games participating in the opportunity to win the progressive prize can only accept wagers of a specific number of $1.00 U.S. coins. In this instance the odds associated with winning the progressive prize are exactly the same on every participating game's progressive pay line.

The control processes of a system illustrated in U.S. Pat. No. 5,116,055 allow gaming devices accepting different coin denominations of the same currency to be played for a common progressive prize. This process is based on a method of translating the coin/pulse information normally generated by each game, into a set of information which results in each game making an approximately equal value of dollars to jackpot amounts that increment the prize value over the theoretical life cycle of one prize award.

The method of translation is characterized by calculations using a constant value for unit of increment per pulse (a coin of a specific denomination and currency) to apply against the actual denomination of the coins used to play the game, the standard game pay table data of hit frequencies (odds) and coins bet. The calculations result in a computed coins per pulse value and a computed percentage to jackpot factor.

The practical application of this process may be hindered by the fact that all results produced during the process are approximations, not the usually expected exactitudes. A further hindrance is in the complexity of the translation process. This may impact the ability of standard business functionality to verify correctness.

In prior art progressive gaming systems and methods a portion of each wager is used to fund an increment to the current prize value, fund the starting value of the next prize after a win occurs, and other uses. Commonly the portion used, usually known as contributions, is determined by control data related to percentages and the coin denomination.

For example, assume a prize starts at $1,000,000 with a contribution rate of 3.5% to fund the next prize's starting value of $1,000,000 and a 2.5% contribution rate to the growth of the current prize's value. Also assume it is linked to gaming devices requiring a $2.00 wager. This means each wager contributes $0.07 (2.00*0.035=0.07) to the next prize's starting value and $0.05 (2.00*0.025=0.05) to the increment of the current prize value. With these contribution percentages there must be about 14,285,715 handle pulls, or games played, between wins for the prize's $1,000,000 starting amount to be funded. (1,000,000/0.07=14,285,714.29). In essence the total wager amount made over the theoretical life cycle of one prize award would be $28,571,430.00 (14,285,715*2.00=28,571,430.00).

During this theoretical time period the prize value would increase by $714,285 (0.05*14,285,714.29=714,285.7145) to make the average prize value worth $1,714,285 for each theoretical win. Also assume that a marketing study has determined that to sustain player interest the prize should be won on average about once every month. This means there should be about 14,285,715 handle pulls, or games played, over a thirty day time span. If each gaming device were able to average about 5 games played each minute for 10 hours a day it would produce 3000 games played per day. If the prize were to be won every thirty days and each gaming device generates 90,000 handle pulls a month (5 games*60 minute/hour*10 hours*30 days=90,000), there would have to be at least 159 gaming devices attached to the prize (14,285,715/90,000=158.73. . . ).

In prior art progressive gaming systems and methods the linkage of a gaming device to a prize is dependent on the gaming device accepting a specific number of coins of a particular denomination and the pay line must always have the same odds. Using the example given, each linked gaming device must only accept a $2.00 U.S. wager to play for the prize and the odds would always be the same, in this case 14,285,715.

In this example it was illustrated that the prior art progressive gaming systems and methods link prizes to gaming devices based on the wager amount and odds fixed in a gaming device's hardware and software. This creates a major problem when the actual marketing acceptance varies from the projected acceptance. Changes needed on the gaming devices to alter the wager amount or odds require replacing the hardware or software in the device. This may be very time consuming and expensive. The prior art progressive gaming systems and methods also make it impossible for a common prize to be linked to gaming devices using different currencies as the basis for wagering due to fluctuating currency rates.

It would be very advantageous to enable linking a gaming device to a progressive prize in a way that would enable changing the linkage criteria without changing the gaming device's hardware or software. This would make the task of adjusting to changing market forces easier and less expensive and also allow linking common prizes to gaming devices using different currencies.

This invention incorporates this advantage by using total wager amount as the basis of linkage between a prize and a gaming device or other gaming apparatus. The total wager amount for a prize is equivalent to the amount needed to finance the average prize value. In the previous example the prize's total wager amount was $28,571,428.58. A prior art gaming device's total wager amount is the product of the wager times the odds and this invention would continue to allow that as a basis of participation for the prior art gaming devices. However, this invention specifies a Free Play apparatus that uses the total wager amount, which may be represented in different currencies, and the wager amount of a specific bet made by a player, to dynamically compute the odds of a prize award event. The advantage gained is the ability to adjust the basis of linkage to quickly and economically respond to changing market forces while allowing play for common prizes using different currencies for placing wagers.

The nature of a progressive prize that is won on gaming devices or apparatus that have play based on odds is that there is no way to predict when a prize will be won. Due to the natures of the random events that determine win or lose, the time span between wins could be very short or very long. Only over a long period of time encompassing many prize awards would the predicted time span between prize awards based on the odds and player participation become apparent.

Under certain circumstances, it would be advantageous to be able to establish a maximum amount of a prize, or to establish a date and time, or other criteria related to a boundary, beyond which a prize award event may be forced upon one or more participating players.

SUMMARY OF THE INVENTION

Objects of the Invention

One of the objectives of this invention is to allow players using gaming devices which accept wagers in different currencies or varying denominations within a particular currency, to share in the possibility of winning common progressive prizes. A critical element in the practical application of this objective is the ability to enable gaming devices or other gaming apparatus containing no linked progressive prize hardware or software logic, to be linked to progressive prizes. The linkage is enabled without modification to the essential characteristics of the gaming device or game apparatus as represented by the gaming device's hardware or software or the playing characteristics.

Another objective of this invention is to teach a method whereby a boundary criterion such as a maximum value, or, an expiration date and time, or other criteria may be specified for a prize. Then, when random play has not created a prize award event by the time the boundary criteria is reached, the method enables the system to randomly select one or more of the current participants as a winner.

These and other objects of the present invention will be realized from the following specifications and drawings.

Brief Description of the Invention

This invention comprises a system and process for linking a plurality of progressive gaming devices' pay lines and gaming devices or other gaming apparatus with or without inherent progressive hardware or software logic, to a plurality of progressive prizes in such a way that freedom of association is constrained only by the business rules of any one of possibly several regulatory agencies involved with an implementation of the invention. Each prize may be controlled by the regulatory rules of jurisdictions different from that of other prizes.

The system's control processes are integrated with the gaming devices, signs and other attached devices or games utilizing device drivers. These units of programmable logic are responsible for controlling and monitoring each attached device or game apparatus. Each device driver communicates with a particular kind of device or game apparatus according to its rules for message content and transmission. The device driver converts the native protocol of the device or apparatus into the common internal protocol used by the central control processes to monitor and control the operation of all like kinds of devices and apparatus.

The monitoring and control of progressive prizes permits a prize award process to be initiated in different ways. Establishing boundary criteria for a prize complements the prior art prize award process that results from a gaming device generating a random prize award event. If a gaming device has not generated a random prize award event when the boundary criteria is met, an award process is started to force a prize award upon one or more randomly selected participating players.

Unlike prior art progressive gaming systems and methods that control linkage between progressive prizes and game pay lines based on some representation of a coin of a specific denomination issued in a specific currency, this invention uses the total wager amount as a common element shared between progressive prizes and the linked game pay lines, other gaming devices and prior art games. This enables linkage to be established regardless of the currency, or denomination within a currency, used to place a wager on a gaming device or game apparatus.

The processes create relationships between a progressive prize based on one currency, and gaming devices and game apparatus accepting wagers in different currencies, by using currency exchange rates to normalize the total wager amount inherent with every progressive prize and its associated games.

The ability to create a relationship between a progressive prize and a progressive game pay line or other game apparatus with wagers using different currencies is conditioned by system parameters set to reflect the rules of the regulatory agency controlling the progressive prize.

BRIEF DESCRIPTION OF DRAWINGS

FIG. 9 is an illustration of the processes involved with accumulating wagers by currency.

FIG. 10 is an illustration of the processes involved with changing percentages or currency exchange rates.

FIG. 11 is an illustration of the processes involved with computing a prize value.

FIG. 15 is a pay table as may be represented for a prior art progressive game.

Definitions

Acquisition Data

Figure 1:
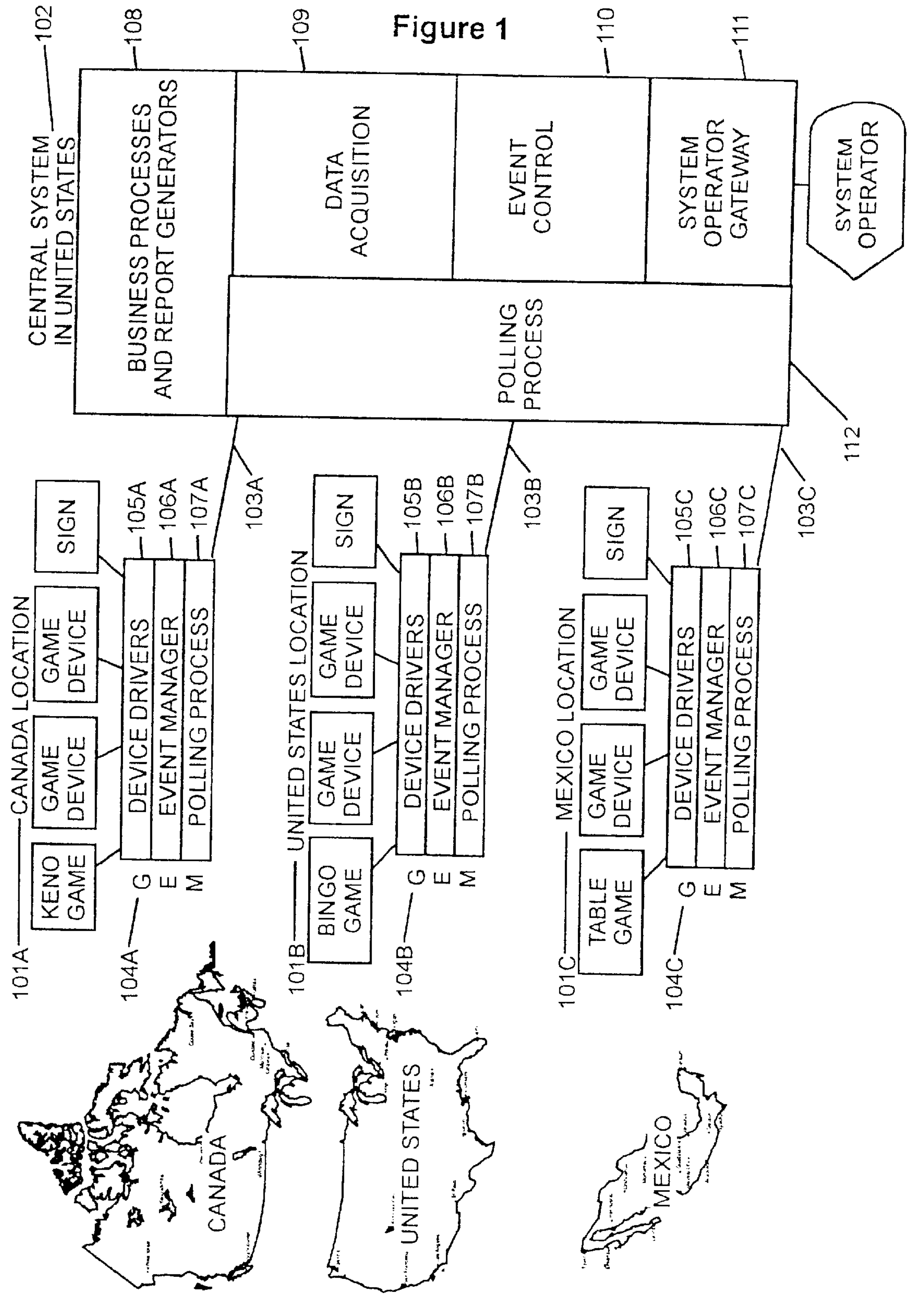
FIG. 1 is a schematic diagram of a simple implementation of the invention to illustrate the international distribution of the system components.

The data produced by the gaming devices as players participate in the progressive system. Data recorded from game meters are one example of the acquisition data.

Central System

One or more sets of computer hardware and software in communication with GEMs or gaming devices, the computer hardware and software being responsible for controlling a distributed system.

Contribution Percent

A percent value associated with a progressive prize. The contribution percents are used to finance the starting value of a prize, increment the prize value, and other uses as dictated by a particular jurisdiction. The financed amounts are computed by multiplying the wagers amounts made towards a prize by the contribution percent.

Control Data

The data input by system operators to define the system environment, operating parameters, constraints and other criteria. Examples include each gaming device, GEMs, communication criteria, prizes, contribution percent factors, linkage criteria between progressive prizes and games, etc.

Device Driver

A set of hardware or software used to monitor and control gaming devices. In addition to the normal control processes it has at least three major responsibilities:

1. To act as interpreter between the central system's standard protocol and a gaming device's unique protocol.
2. To serve as the primary control point for qualifying data acquired by the central system according to specific events.
3. To filter bad or inconsistent data generated by gaming devices before the data is acquired by the central system, creating events whenever an instance of bad or inconsistent data is detected.

Device Protocol

The set of messages used to control a specific gaming device. These messages may be consistent only for a particular kind of gaming device manufactured by a particular manufacturer.

Distributed System

A system consisting of a plurality of sets of computer hardware and software in communication with and controlling a plurality of computers located at geographically separated sites.

Event Condition

A condition arising from some sort of incident that is either outside the set of normal incidents, or is a normal incident requiring specific processes to be performed to meet the rules and regulations of a governing agency.

Event Data

The data generated by the system to track each event. For example the recording of a prize award may include audit records recording any meters that could not be gathered, the prize value displayed to the player, the actual prize value computed after all contributions were computed, etc.

Event Process

A process that enables a controlled response to an event condition detected somewhere in the system. The objective or the event process is to ensure the situation is handled in accordance with the rules and regulations of a governing agency. Examples may include progressive prize hits, end of day processes, malfunctioning or non-responding gaming devices, remote computers, or other system components.

FPA

See Free Play Apparatus

Free Play Apparatus

An apparatus that communicates with a gaming device and comprises progressive hardware and software needed by the device to be linked to one or more progressive prizes.

Game

A process providing a player with the opportunity to place a wager, interact in some manner with either a gaming device or a house employee, such as a dealer or table operator, for the purpose of winning a prize.

Gaming Device

A device used as a game of chance where a player may place wagers to participate in play in return for the chance of winning prizes such as a slot machine. Also, devices that control games or other gaming devices such as the Free Play Apparatus used to control non-progressive gaming devices, keno, bingo, table games or others such as roulette.

Gaming Environment Manager

A computerized device that connects the central system with the device drivers controlling gaming devices.

GEM

See Gaming Environment Manager

Handle Pull

A gaming industry term used to indicate one play on a gaming device or other game of chance.

Host Computer

A computer acting as the controlling entity for another computer or computerized device.

Linked Game

A game that is associated with one or more progressive prizes.

Pay Table

The data required in each gaming device that defines the out come of each play that can result in a win condition.

Poll Cycle

A method of controlling the accumulation of game meters that varies the rate of accumulation according to the available communications and computing capacity of the system at any particular point in time. As the load on the system increases, the number of poll cycles increase to spread the processing requirements allocated to accumulation over a greater period of time.

Prize Award

The condition that results from the win of a progressive prize on a gaming device and the subsequent prize award event that ensures all jurisdiction rules are enforced in regards to meter collection and calculation of the final prize amount.

Progressive Pay Line

An entry in the pay table of a gaming device that requires linkage to a progressive system to determine the prize value to be paid to a player when the results of play meets the criteria of the pay line for a win.

Progressive Prize

A prize that starts at some value then is incremented as wagers are placed on gaming devices linked to the prize. The increment value is the result of multiplying the value of the wagers made by a contribution percentage.

Protocol

A set of defined messages used to communicate between system components.

Remote Computer

A set of computer hardware and software located at a site other than the central site.

Surcharge Percent

A percent value computed by the linkage process that ensures wagers made by participating players are subjected to equal contribution percentages.

System Activity Data

Data that results from players making wagers on gaming devices linked to the system. Examples include the meter data captured for each prize award event.

System Operator

People charged with the responsibility for operating the central system computers, entering control data, and ensuring event processes perform correctly.

System Standard Protocol

The set of predefined messages used by the system to communicate between processors. Each message has a specific set of information according to its purpose.

Total Wager Amount

For a progressive prize, this is the theoretical sum of all wagers made for each prize award event. The total wager amount must be of a value that will support all the criteria for the prize starting value, increment values, and any other values generated as a result of contribution percents applied against wagers.

For a gaming device, this is the sum of all wagers made over the theoretical number of handle pulls, or plays of a game, between the prize award events. The total wager amount is computed by multiplying the wager amount times the odds of winning the prize.

Two Way Communications

A method of enabling two components of the system to carry on a conversation in which one component directs or otherwise instructs another component to carry out some activity or other function. The component receiving the instruction then responds with information that enables the initiator of the conversation to ascertain the results of the action performed or attempted. The conversation consists of sets of protocol messages.

Win Number

A unique number assigned the set of a progressive prize's system activity data generated by gaming devices linked to the progressive prize. The purpose of the win number is to control the accumulation of wagers made to each prize award event and any prize related events.

DESCRIPTION OF THE PREFERRED EMBODIMENT

The physical embodiment of this invention is comprised of one or more local or remote locations. Each location contains one or more processors, known as Gaming Environment Managers (GEM), which together with device drivers, are used to monitor and control each connected gaming device or other prior art game or apparatus. Each GEM is connected to a central system via appropriate communication lines.

FIG. 1 illustrates a simple instance of the invention where one location 101A has one GEM 104A and is located in Canada. A second location 101B has one GEM 104B and is located in the United States. A third location 101C has one GEM 104C and is located in Mexico. The central system, 102, is in the United States. This figure is for illustration purposes only, there is no system restriction on how many locations there may be, where the locations physically exist, how many GEMs may be at one location, nor where the central system may exist.

Communication lines 103A, 103B and 103C connect the components of the system. These communication lines could be of any particular kind depending on the capability of an international location's existing facilities.

Each GEM contains device drivers 105A, 105B and 105C, for monitoring and controlling the attached devices, an event manager 106A, 106B and 106C, and a polling process 107A, 107B and 107C. The polling processes coordinate the sending of transactions to and from the polling process 112 at the central system 102. The event managers process each transaction from the central system and create transactions to be returned to the central system. The device drivers monitor and control each device or apparatus and perform the data acquisition to record meter data indicative of wagering activity and events generated from each device.

The central system contains the business process and report generation functionality 108 responsible for maintenance of all information used to define the physical system, including all games, devices, prizes, linkage of games and devices to prizes, currency exchange rates and other data needed by the operating logic. It coordinates this information across the computer hardware platforms to ensure accuracy. It is also the central repository and distribution point for all data acquired by the system.

The polling process 112, is responsible for scheduling polls to each GEM, transporting the transactions generated by the other central system processes to the GEM, then receiving transactions from the GEMs and passing them to the data acquisition process 109. It also keeps the operational statistics needed to monitor and tune the way the system functions. These statistics relate to poll cycle times, number and type of transactions processed and other relevant data by time of day and day of year.

The data acquisition process is responsible for accumulating the records of wagering activity that occur on each game, applying wagers towards prizes, computing prize amounts, and maintaining the memory tables used by all other elements of the central system to control processes. As event transactions are acquired they are passed to the event control process 110.

The event control process 110 is responsible for monitoring the progress of events and creating messages needed to affect decisions to carry out or terminate operations.

The system operator interface process 111 serves as a gateway for the system operator to monitor the operational performance of the system and issue commands.

Normally, there are a number of steps outside the system that must be taken before allowing player participation to occur. These steps are related to regulatory agency approval for the gaming devices, games and prizes along with the physical installation of the equipment used for wagering, monitoring equipment and the establishment of communication lines.

After regulatory approval is gained, the physical environment is defined to the system to enable it to perform its operational functions. The central system processes are responsible for ensuring the data approved by the regulatory agency is entered correctly and that the operational rules are adhered to. Normally, the regulatory agency must approve the data related to the progressive prizes, locations of gaming devices and other game apparatus, the gaming devices along with their games and progressive game pay lines, the linkage between progressive game pay lines, gaming devices and other game apparatus and progressive prizes, and other data prior to the data being entered into the system.

The regulatory agency does not normally require beforehand approval of contribution percent changes, currency exchange rates and other data related to the deductions from the revenues of the owners being contributed to prize values or reserve funds. However, it is the responsibility of the system to ensure these elements are accumulated from wagers in a manner that is fair and equitable among the participating players for a prize and that the proper audit trails are created to enable reporting processes to verify system activity.

Once the system is operational, the normal day to day control functions include adding and removing progressive prizes, adding and removing equipment and communication lines, controlling the collection of wagering activity, contribution percent changes, exchange rate changes between currencies, and progressive prize awards, and ensuring all events are handled properly. There is a daily process that reconciles player wagering activity for the day and balances all financial activity. All activities are monitored and controlled by the central system processes.

To ensure all system activity is controlled on a standard time of day and day of year basis, all system processors operate on Greenwich Mean Time or some other standard time. The time is coordinated during the continuous polls from the central site to the local and remote sites. Local presentation of time of day and day of year is produced via system routines that convert the Greenwich Mean Time to the standard of the particular location based on time zones, daylight savings criteria, or other criteria that may be in effect for a particular location.

The descriptions of the features of this invention are presented from a logical beginning that describes the processes involved with entering the control information. This is followed by the description of the process controls used to monitor and control player activity. It ends with a description of the control functions that coordinate the end of day.

Figure 2:
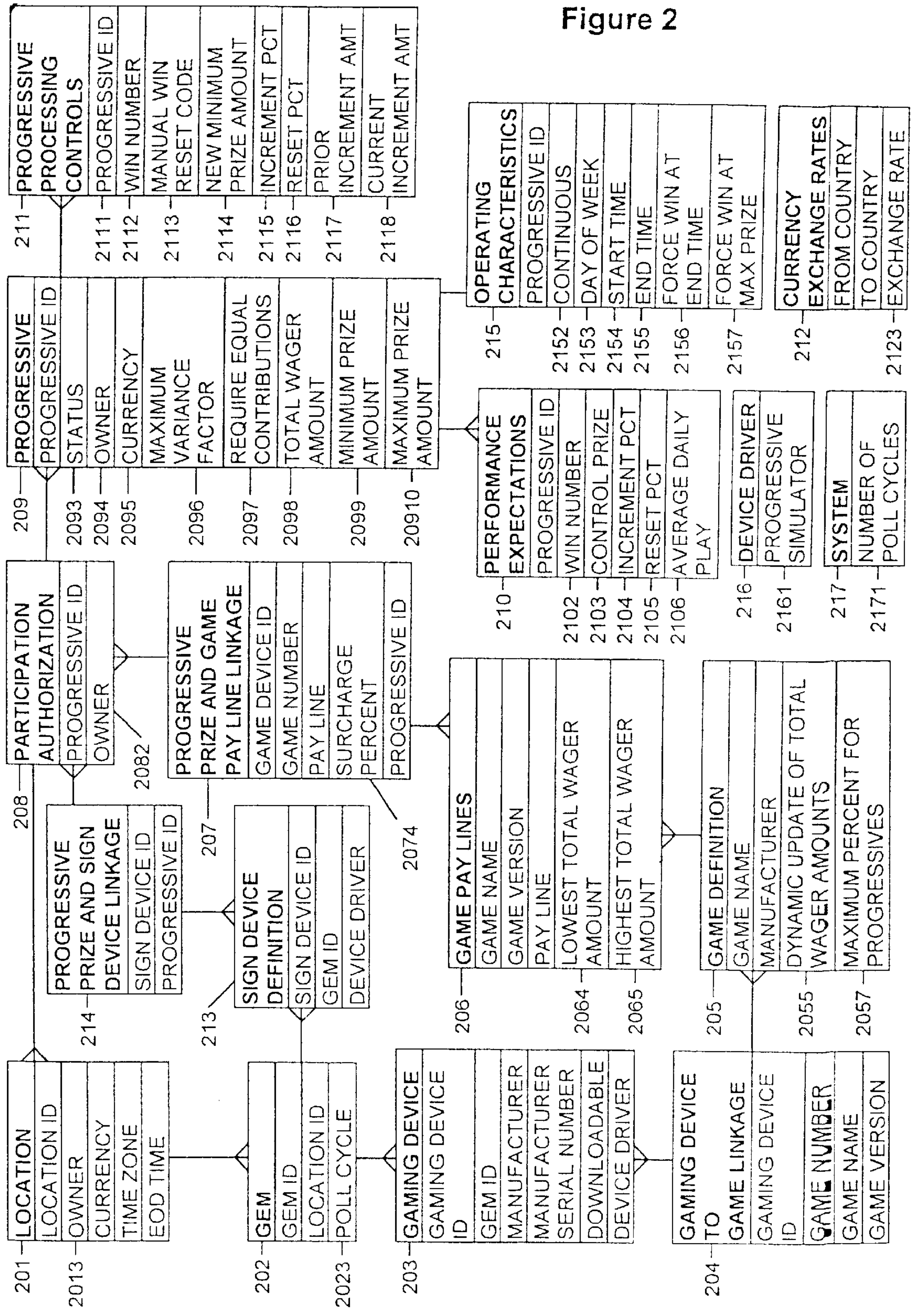
FIG. 2 is an entity diagram of the data used to describe the control processes of the invention.

FIG. 2 is a simplified entity relationship diagram used to demonstrate how system data is related. When the line connecting entities has a crow's foot on its end, it means there are one or more instances of that entity available to relate to the other entity. When the line simply connects to an entity, it means there is only one instance available. For example, the relationship between location 201 and GEM 202 indicates that for one location there may be one or more GEMs.

FIG. 2 illustrates the entities and data involved with defining the physical environment to the system. Progressive prize data 209, performance expectations 210 and progressive processing controls 211 will normally be the first data entered. Location data 201 will be entered for each physical site where gaming devices will be located. There is an owner of each progressive prize 2094 that must enter into an agreement with the owner of a location 2013 and the agreement approved by the regulatory agency before the location owner can be authorized for participation 2082. Once this data has been entered, the remaining data is entered to define each GEM 202, each gaming device 203, each game definition 205, each game pay line to be linked to a progressive prize 206, the linkage of each game definition to a gaming device 204, and the linkage of each pay line or gaming device to a progressive prize 207. Communications and other related data that may not be relevant to ensuring the rules of the regulatory agency are adhered to are not included in FIG. 2.

As games and other devices are defined to the system they are associated with a particular device driver. Device drivers function as a buffer between the system and a particular type of device or game apparatus providing the system independence from the peculiarities of specific devices.

The general functions of a device driver are explained referencing FIG. 1. The polling process 107A receives transactions from the central system polling process 112 and passes them to the event manager process 106A. The event manager process either carries out the commands contained in the transaction, or it may pass certain commands directly to the device drivers for action. The device driver either carries out the command or converts the command to the unique format required by the particular device or game apparatus. The device driver then periodically polls the device, sending system messages to the device for action. The device responds to the poll with messages it has queued. The device driver converts the device's messages into the system format and queues them for sending to the central system. As the polling process 107A is polled by the central system 112 it packages any transactions prepared by the event manager or device drivers and sends them to the central system.

Figure 3:
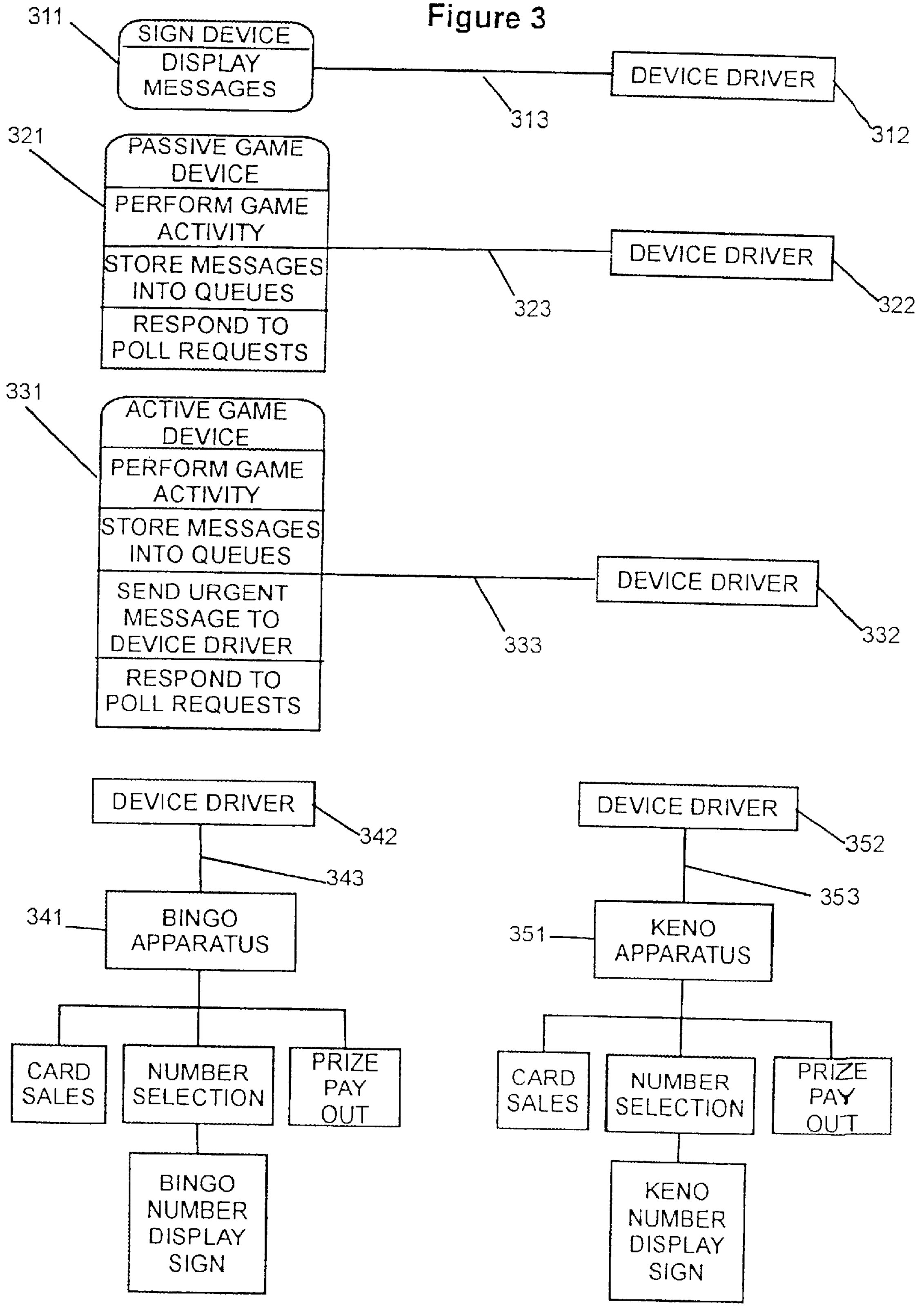
FIG. 3 is a diagram illustrating the different capabilities of device drivers.

FIG. 3 illustrates some of the different methods used by the device drivers to control various devices and game apparatus. Sign devices 311 normally receive a protocol message over a communication line 313 to tell it what is to be displayed. The device driver 312 converts the system message to the unique format required by the sign device. There is usually a one way communication for most sign devices.

Device drivers that control games have several permutations due to the wide variety of gaming devices, their capabilities, and the way this invention uses them to simulate progressive play when the gaming device itself has no progressive logic in its hardware or software.

A passive gaming device 321 never sends unsolicited messages to the system. As it performs its functions, all messages are put into queues. The device driver 322 receives messages from the system and converts them into the unique format required by the gaming device. The device driver 322 periodically polls the gaming device over a communications line 323 sending any system messages to the gaming device. As the gaming device 321 is polled it performs the required actions as dictated by received messages, and responds with messages from its queues. The device driver 322 converts the device's messages to the system format and puts them into a queue for sending to the central system.

An active gaming device 331 sends unsolicited messages to the system under some conditions. The device driver 332, is capable of receiving the unsolicited message over a communication line 333. Other than being able to receive an unsolicited message from a device, the device driver 332 is very much like device driver 322 in that it also periodically polls the gaming device to send system messages and receive device messages. In this case, the communication line 333 may represent one or more physical lines depending on the particular gaming device's requirements.

When the device driver is controlling a gaming device that contains no progressive logic, either the device driver or a Free Play apparatus attached to the gaming device may contain the logic used to enable the gaming device to participate in progressive play for a common linked progressive prize. This capability is explained in detail as part of the linking process that connects a particular gaming device with a particular prize.

Device drivers 342, 352 that monitor and control game apparatus such as a bingo 341 or keno 351 game, require the game apparatus to be able to receive and send messages associated with each play of the game over an appropriate communications line 343, 353. The message information must provide at least an identification of the game being played, the number of players participating, the amounts wagered and the amounts won. It is anticipated that certain bingo and keno games may also, through the use of total wager amounts, participate in progressive prizes and thus require prize award information. The central system would provide the current prize value for display by the bingo or keno game apparatus at the beginning of each game. After a game has been played, the game apparatus would send to the system the information about the game played including prize award events.

Figure 4:
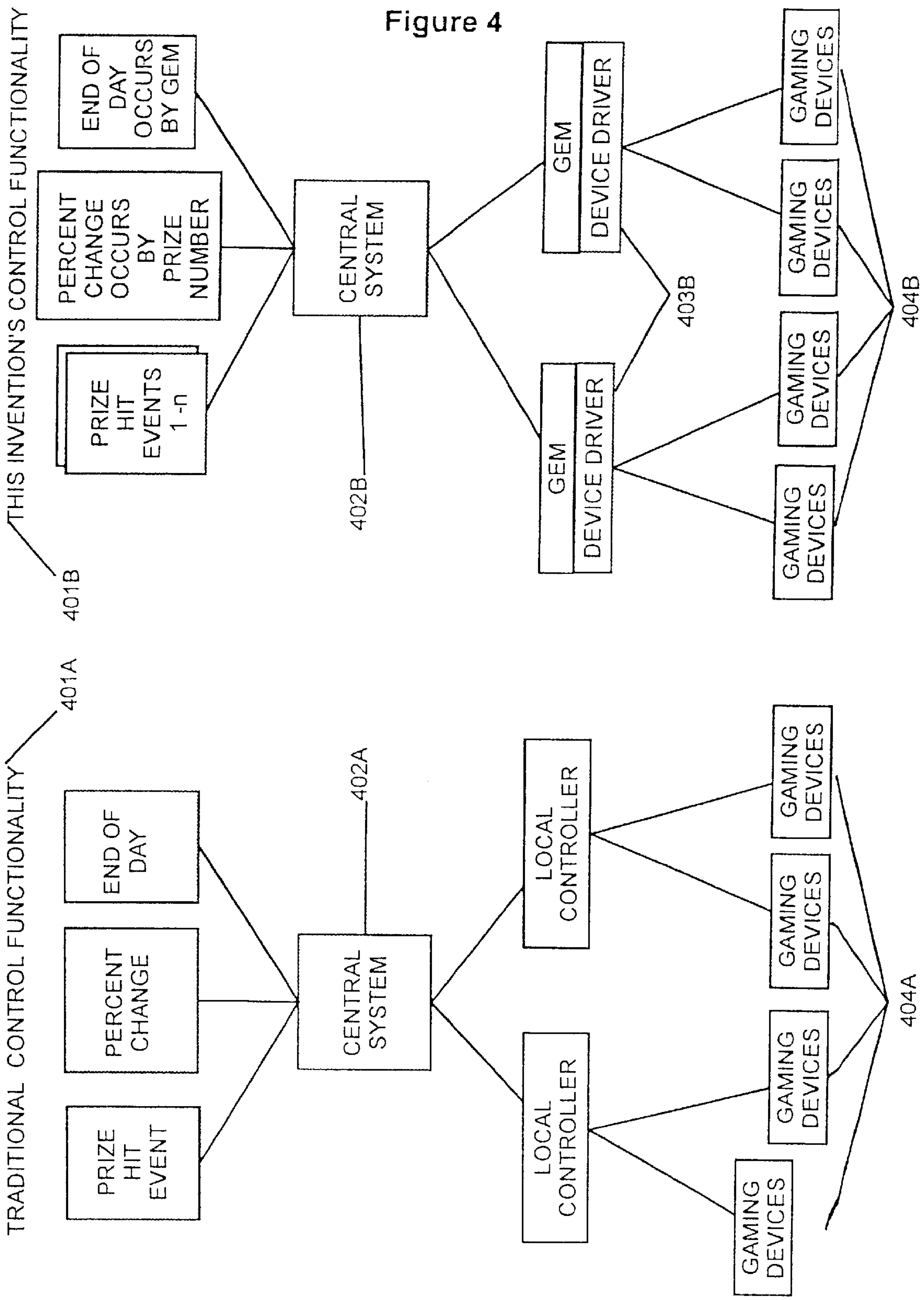
FIG. 4 is an illustration of the difference between how the prior art progressive gaming systems and methods handle events and the methods used by this invention.

In addition to isolating the central system from the physical devices, the device drivers are responsible for qualifying each set of acquisition data and event data with the appropriate progressive prizes' win number, currency, and other data. The processes associated with prize award events and end of day shall be described further on however, it is noted that the device driver is a key factor that enables the practical application of this invention's processing philosophy. The device driver's responsibility for event qualification allows the central system to collect data for each major event using simple data acquisition logic. As illustrated in FIG. 4, this is not the case for prior art progressive gaming systems and methods that attempt to coordinate system wide events at the central system level.

With prior art progressive gaming systems and methods control functionality 401A, data is acquired from devices according to events controlled by the central system. Event conflict resolution at this level is very complex. In a very large system it approaches impossible. This is due to the fact the central system 402A must take into consideration conflicting random events that may be generated by the gaming devices 404A, particularly prize award events. For example, in prior art progressive gaming systems and methods, the first act of processing a prize award is to set a system wide state associated with a coordinated effort to reset prize values and collect meters from linked gaming devices. The fact that random events in this type of system are truly random means it is possible for other prize award events for the same prize to be generated while one is currently being processed. This results in either very complex control logic to enable one event to override another event or terminate it, or very simple control logic to merely ignore the subsequent event and let system operators figure it out. The last option is most commonly used due to the very low probability events have of conflicting with each other.

However, the international application of this invention presupposes a significantly larger number of devices to be incorporated in a physical embodiment than that usually present in prior art progressive gaming systems and methods. This anticipation will result in a much more likely probability that there will be conflict between events. Therefore, the control logic of this invention has been structured to push the qualification of data associated with events to the lowest level of the system, namely the device drivers 403B controlling the gaming devices 404B. At this level the qualification of data becomes a binary decision because a particular device can have only a single state. When data arrives at the central system it is acquired into the appropriate event category and instance according to the qualifying data assigned by the device driver. This method of separating the control processes for conflict resolution from the central system allows the central system to function as a simple data acquisition process for accumulating the data from the device drivers while retaining complete control over every event. Data acquisition is explained in detail in the appropriate section dealing with prize awards, percent changes, and end of day processes.

While data edits occur throughout the data entry processes, the process of linking progressive prizes to gaming devices is subjected to special checks to enforce compliance with the rules of the regulators, the owners of the prizes and the owners of the gaming devices. From the regulatory viewpoint, these checks ensure that the theoretical total wager amounts are substantially equal and that contributions are collected equally from all players. From the viewpoint of the owner of a prize, the checks ensure only those owners with an agreement to participate can be linked. From the viewpoint of the owner of a gaming device or apparatus, the checks ensure that the contribution percentage being taken from the wagers does not exceed the maximum authorized.

Figure 5:
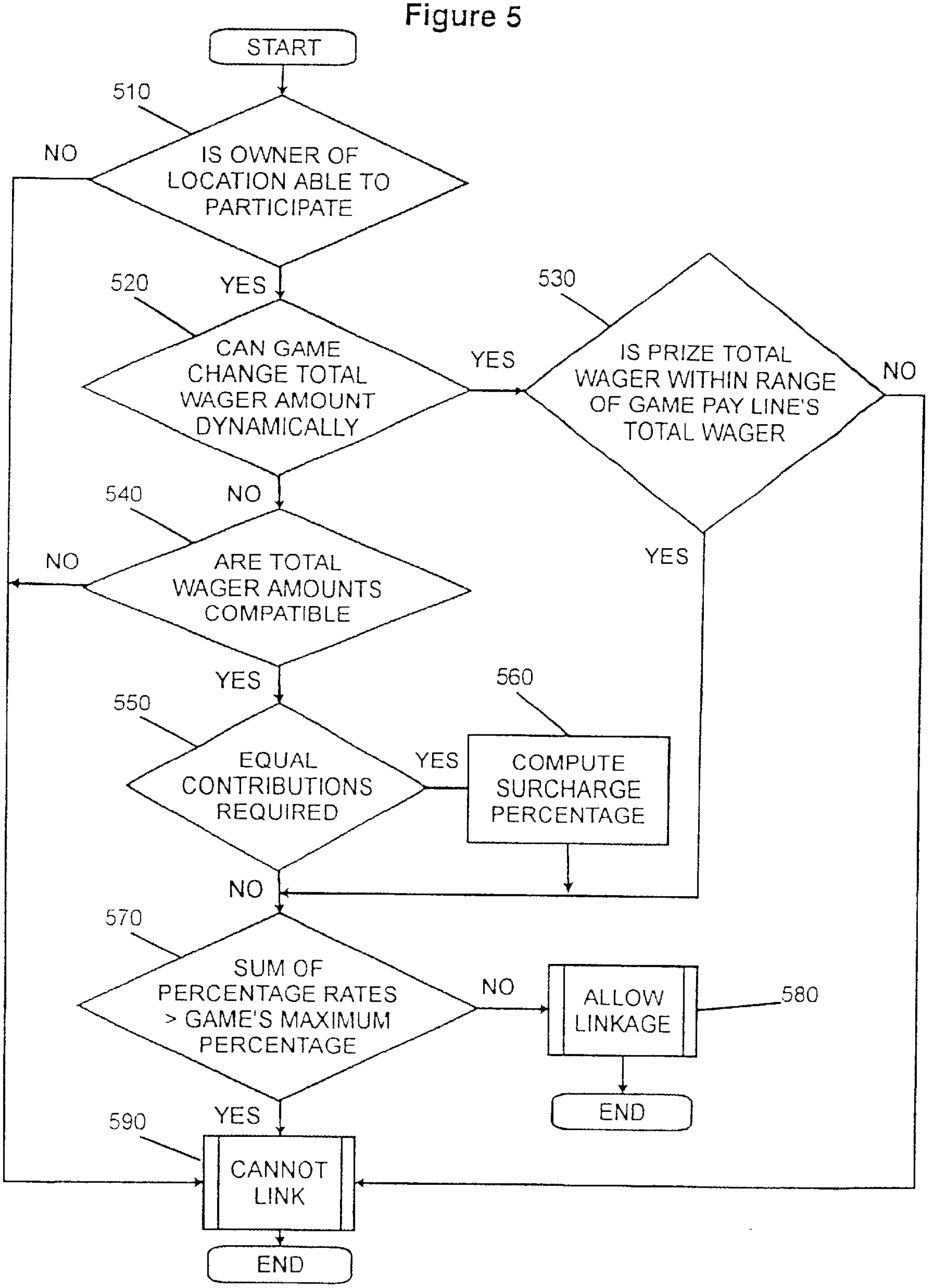
FIG. 5 is a flow chart depicting the decisions used when linking a game's progressive pay line to a progressive prize.

FIG. 5 illustrates a flowchart specifying the logical steps taken to decide if a progressive game pay line can be linked to a progressive prize. The first check 510 ensures the owner of the location where the gaming device or game apparatus physically exists has authorization to participate. Referencing FIG. 2, this is a matter of ensuring the owner value 2013 in the location data 201 exists in the owner value 2082 in the participation authorization data 208. If the check fails, the linkage 590 cannot be done.

The decision blocks 520 through 570 ensure the total wager amounts of the gaming device pay line and the progressive prize are compatible according to the rules of the appropriate regulatory agency. Check 520 conditions the logic based on the ability of the game to dynamically modify its total wager amount as indicated by the logical setting of the dynamic update of total wager amounts field 2055 in the game definition data 205. If the game has the ability to dynamically update its total wager amount, the check is made 530 to see if the progressive prize's total wager amount 2098 is within the range of total wager amounts 2064 and 2065 in the progressive game pay line data 206. The check is satisfied with this equation:

$$(GTL*ER)=<PT$$

and $$(GTH*ER)=>PT$$

where

GTL=game pay line's lowest total wager amount 2064

GTH=game pay line's highest total wager amount 2065

ER=exchange rate from location to prize currency 2123

PT=prize's total wager amount 2098

For example a Canadian game playing for a USA prize:

(25,765,477.87*0.7484)=<28,571,428.58 and (48,242,857.15*0.7484)=>28,571,428.58 where the Canadian game has the ability to accept a total wager amount in the range of 25,765,477.87 through 48,242,857.15 and automatically adjust its wager and or odds to fit the requirements of the prize.

If the equation returns a false value, then the linkage 590 cannot be done.

If the game does not have the ability to dynamically update its total wager amount, the check is made 540 to determine if the progressive prize's total wager amount 2098 is compatible with the progressive game pay lines lowest total wager amount 2064 with this equation:

$$\text{absolute value of } \frac{PT-(GTL*ER)}{PT} \text{ must be } =<MV$$

where

GTL =game pay line's lowest total wager amount 2064

ER=exchange rate from location to prize currency 2123

PT =prize's total wager amount 2098

MV=maximum variance allowed for this prize 2096

For example a Canadian game playing for a USA prize:

$$\frac{28{,}571{,}428.58-(38{,}235{,}158.95*.7471)}{28{,}571{,}428.58}=.000207$$

In the above example, if the maximum variance had been set to, for example 0.000, or 0.0003, then the equation would return true. Had it been set to, for example 0.0000 or 0.0001, then the equation would return false.

If the equation returns a false value, then the linkage 590 cannot be done.

Check 550 is made to determine if the prize requires an equal contribution amount from each player, indicated by the require equal contribution flag 2097. If it is true, a surcharge percent is computed 560. Computing the contribution amount using the sum of the contribution percent and the surcharge percent ensures exactly the same contribution amount is taken from each wager. The surcharge percent is computed with this equation:

$$SC=\left(IP*\frac{PT}{GTL*ER}\right)-IP$$

where

SC=Surcharge Percentage 2074

IP=progressive prize's increment percent 2114

PT=prize's total wager amount 2098

GTL=game pay line's lowest total wager amount 2064

ER=exchange rate from location to prize currency 2123

Following on with the previous example, $$.00000415979493=\left(.02*\frac{28{,}571{,}428.58}{(38{,}235{,}158.95*.7471)}\right)-.02$$

As can be demonstrated, with this surcharge percent, the Canadian Game would, over the theoretical life cycle of the prize award contribute exactly the same amount from the total wagers represented by the total wager amount.

28,571,428.58*0.02=571,428.5716

(38,235,158.95*0.7471)*0.02000415979493=571,428.5716

The final check is made 570 to determine if the sum of the percentages being taken for progressive purposes exceeds the maximum allowed by the owner of the game. The check is satisfied with this equation:

$$(SC+IP+RP+OP)=<MP$$

where

SC=Surcharge Percentage 2074

IP=progressive prize's increment percent 2114

RP=progressive prize's reset percent 2115

OP=any other percentages not described in this invention

MP=game's maximum percent for progressives 2057

If the equation returns a false value, then the linkage cannot be done 590 otherwise the linkage is allowed 580.

Creating a linkage between a gaming device with no progressive pay lines and a progressive prize requires that the Free Play apparatus be attached to the gaming device to contain the logic for generation of random numbers to simulate the play of a progressive pay line. This capability is checked by the logical setting of the progressive simulator flag 2161 referencing FIG. 2. In addition, a particular regulatory agency may require that the device driver supply a visual display of the current prize amount and provide audio notification of a prize award event, both of these capabilities are not normally a part of a gaming device with no progressive capabilities.

Figure 6:
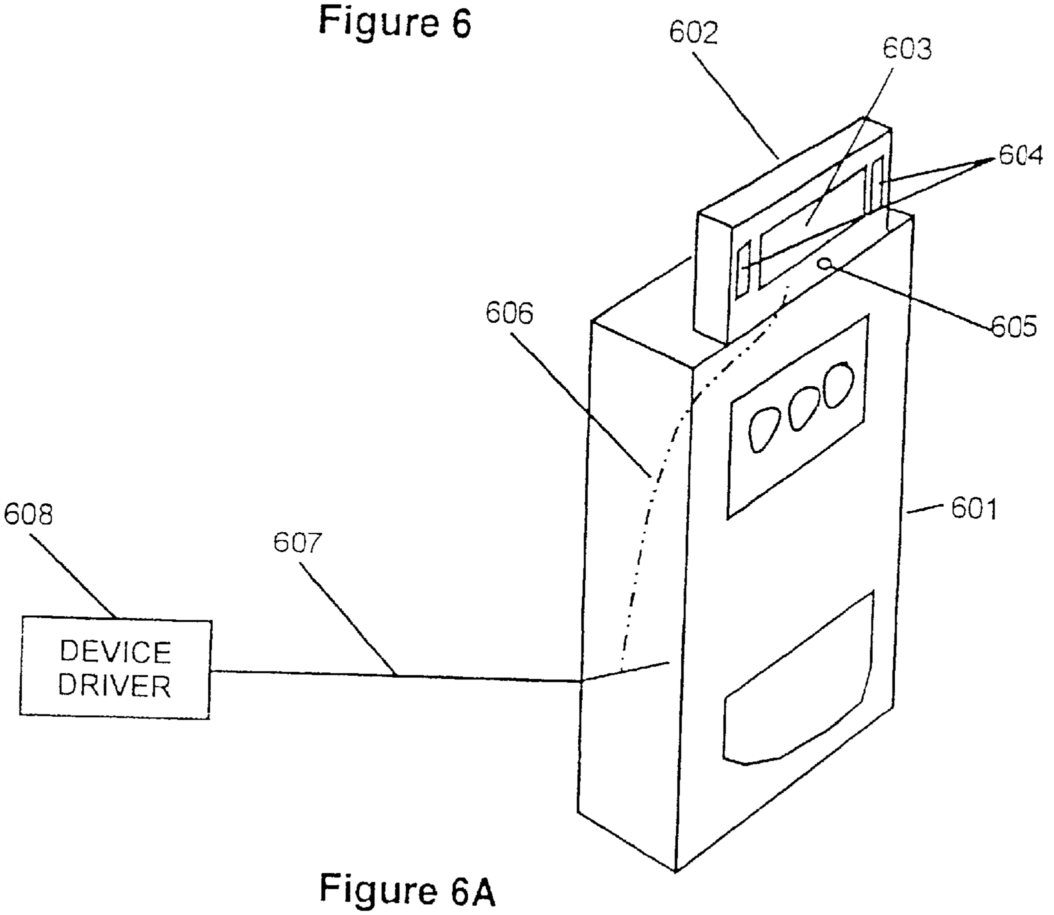
FIGS. 6 and 6A are diagrams explaining the Free Play apparatus attached to gaming devices with no progressive prize logic.

FIG. 6 illustrates an Free Play apparatus used to provide a connection between a device driver and a gaming device with no progressive pay line logic for the purpose of enabling the gaming device to participate in a linked progressive prize. The Free Play apparatus 602 would contain a standard processor board, a video display 603 and speakers 604 and, in this case, be mounted possibly on top of the gaming device 601 such that the Free Play apparatus's communication and power supply lines 606 would be contained inside the gaming device's cabinet.

The Free Play apparatus' communication line would be connected to the device driver's communication line 607. The connection may be direct, in which case the Free Play apparatus performs all communications between the device driver 608 and the gaming device 601, or with a standard communication line adapter used to split the signal, in which case the Free Play apparatus would perform only the communications related to progressives. The connections would be located inside the gaming device's cabinet. Communications from the device driver to the Free Play apparatus would enable the device driver to send appropriate configuration messages to the Free Play apparatus controlling the video display and speakers. The messages would specify information such as the current prize values for prizes linked to the gaming device as well other information, such as commercials, advertising clips, or other messages for display to the players. Communications from the Free Play apparatus to the device driver would consist of event messages indicating prize awards, intruder events, malfunction events and response messages.

Figure 6A:
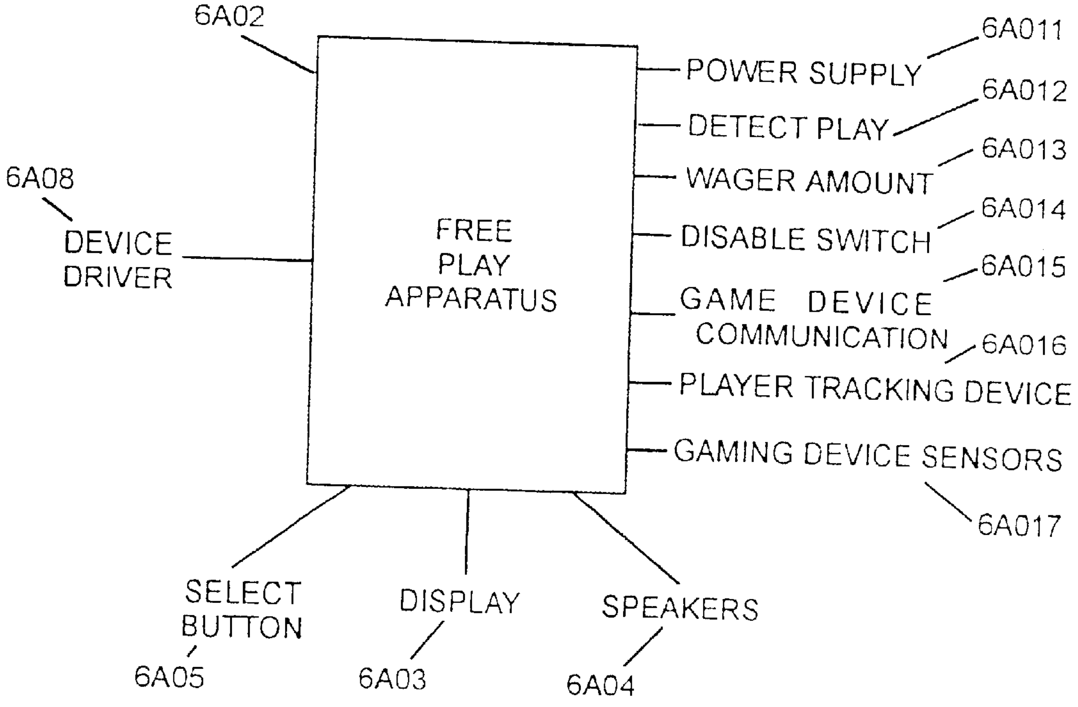

FIG. 6A describes the connections between the Free Play apparatus and its external interfaces. The Free Play apparatus 6A02 is powered by a connection to the gaming device's power supply 6A011. It exchanges messages with the device driver using a communications line 6A08. Instructions for selecting prizes are received from players pressing a selection button 6A05. Messages are sent to players via the display connection 6A03 and the speaker connection 6A04.

The functionality of the Free Play apparatus is driven from connections to the gaming device. When a player initiates play, an impulse is generated on the connection 6A012. The amount of the wager made is obtained from connection 6A013. Sending the appropriate signal through the connection 6A014 disables the gaming device. If the Free Play apparatus has a direct connection to the device driver, then the connection 6A015 would be used to send central system messages to the gaming device and also to receive messages from the gaming device to be sent to the central system.

If the gaming device had an attached player tracking device, communication line 6A016 would be used to provide the interface between the device and the central system.

The Free Play apparatus would be connected to the various sensors incorporated in the gaming device that detect opening of doors, tilting of the device or any other security related events through one or more connections 6A017.

Figure 7:
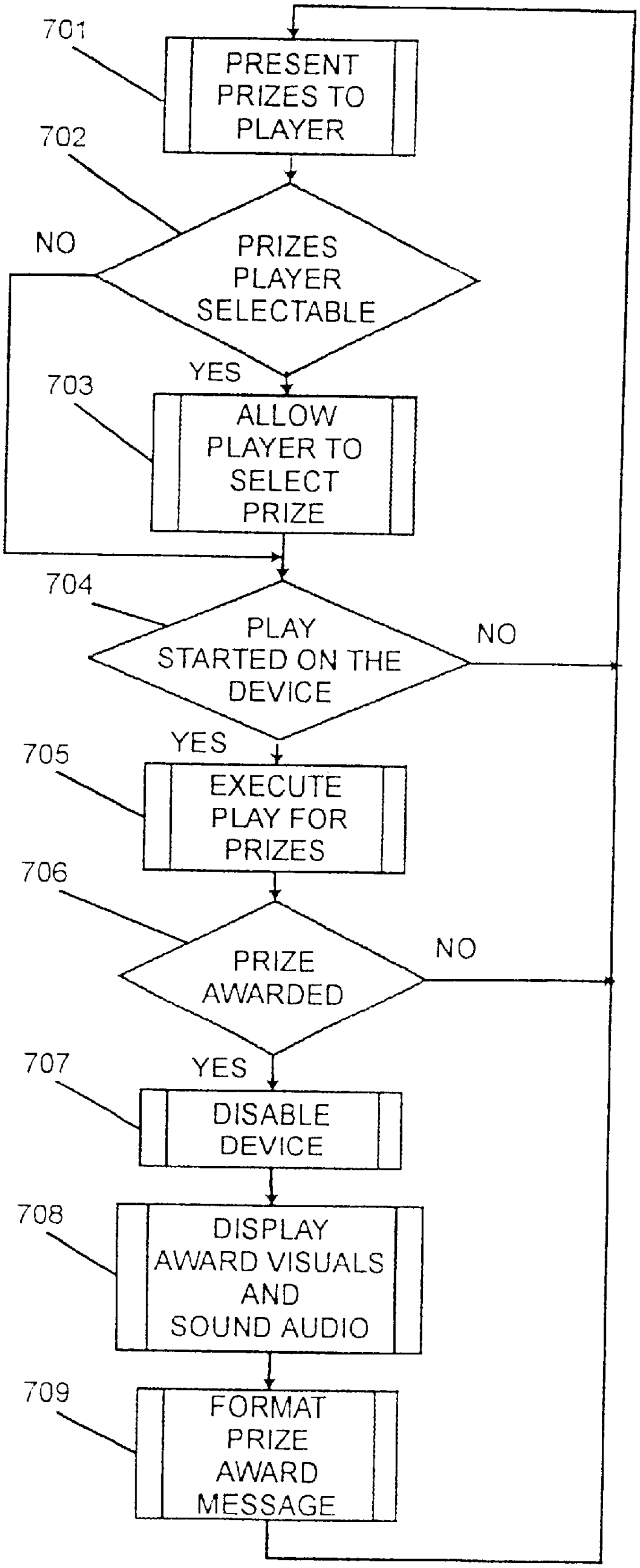
FIG. 7 is a flow chart illustrating the logic of the Free Play apparatus.

FIG. 7 illustrates the functionality of the Free Play apparatus' logic. When the Free Play apparatus is enabled, it would present the available prizes to the player based on criteria such as amount of the wager, player rating or others 701. If multiple prizes are available, the Free Play apparatus may also contain a selection button 605 (FIG. 6) to enable the player to select from a menu of different progressive prizes 702. In this case, the Free Play apparatus would be configured to select a default prize, and enable the player to make a selection 703 only when the gaming device is not actively playing a game. As soon as play is detected on the gaming device, the currently selected prize is the one being played for.

The Free Play apparatus would actively monitor the gaming device 704 to detect play at the instant it occurs. As soon as play is detected, the Free Play apparatus would execute play 705 for each selected prize. Play is executed by determining the value of the wager, then creating a set of numbers for the random number generator using this equation:

$$MR = \frac{PT}{WG}$$

where

MR=Maximum number for the range of random number selection

PT=Prize's total wager amount

WG=Wager made as a multiple of the lowest monetary unit

For example, if the total wager amount is 2,857,142,858 and the wager made is $2.00 then:

$$14{,}285{,}715 = \frac{2{,}857{,}142{,}858}{200}$$

These numbers are the same as previously used in the description of related art. In this case the play on the Free Play apparatus exactly matches that theoretically produced in the before mentioned examples. By varying the amount of the wager it can be easily demonstrated that the computed odds, represented by the maximum number for range of random numbers, will compensate for any value of the wager made, such that the total wager amount is always the same.

The Free Play apparatus would then generate a random number from the range of 1 through the maximum number for the range as computed. If the number produced was equal to a predefined number, such as the number one ("1"), then the prize award process would start. In essence, this control function provides a player with two plays for each wager. One associated with the gaming device, the other when the Free Play apparatus performs the random number selection.

However, one possible embodiment would connect the wager connection 6A012 with a separate coin or bill acceptor attached to the gaming device. In this embodiment a range of random numbers would only be created if the player made a separate wager for the purpose of playing for the progressive prize.

If the play results in a prize award event 706, the Free Play apparatus would immediately disable the gaming device 707 and create the appropriate visual and audio output to notify the player of the prize award 708. The Free Play apparatus would then generate a prize award event for the central system 709.

Depending on the specific gaming device, the Free Play apparatus may contain various sensors to allow it to detect intrusions into the device's cabinet. For example, sensors could detect the opening of the device cabinet door, access to the device's logic area, tampering with the Free Play apparatus housing, etc. Whenever any of these alarms are triggered, the Free Play apparatus would disable the device and transmit the appropriate event messages to the system.

Figure 8:
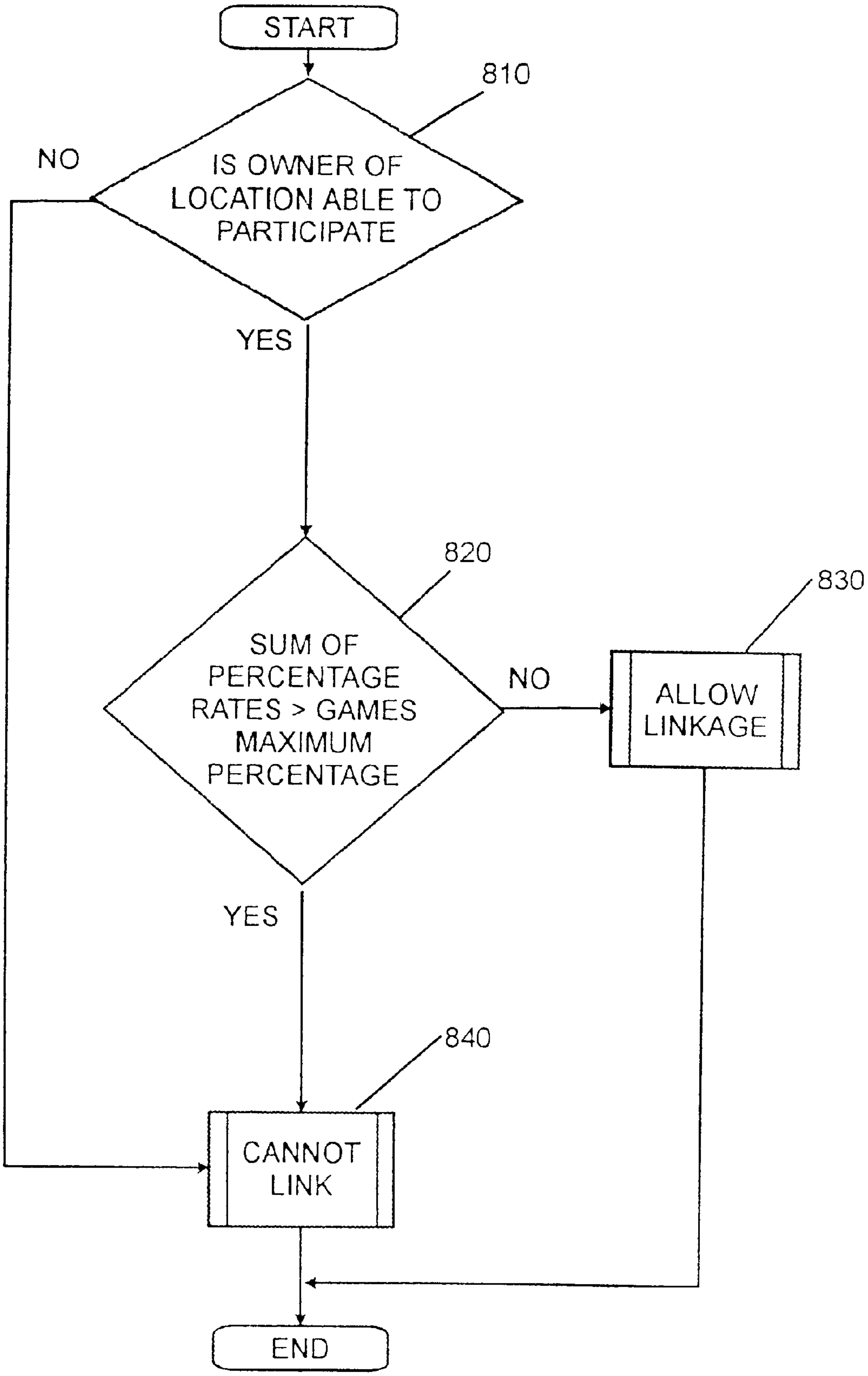
FIG. 8 is a flow chart depicting the decisions used when linking a Free Play apparatus to a progressive prize.

The control processes that links the Free Play apparatus with a progressive prize is illustrated in FIG. 8. The first check 810 ensures the owner of the location where the gaming device physically exists has authorization to participate. Referencing FIG. 2, this is a matter of ensuring the owner value 2013 in the location data 201 exists in the owner value 2082 in the participation authorization data 208. If the check fails, the linkage 840 cannot be done.

The final check is made 820 to determine if the sum of the percentages being taken for progressive purposes exceeds the maximum allowed by the owner of the game. The check is satisfied with this equation:

$$(IP+RP+OP)=<MP$$

where

IP=progressive prize's increment percent 2114

RP=progressive prize's reset percent 2115

OP=any other percentages not described in this invention

MP=game's maximum percent for progressives 2057

If the equation returns a false value, then the linkage cannot be done 840 otherwise the linkage is allowed 830.

In other possible embodiments the functionality of the Free Play apparatus could be included in the hardware or software logic of the gaming device itself.

Once all data is entered and prizes and games are linked, the gaming devices are enabled for player participation. As player participation occurs, the control processes accumulate the wagers made for each prize by currency. As the device drivers monitor each gaming device, play is detected as the gaming device's meters change. For each play, the device drivers format a meter message based on values taken from the gaming device. The message is sent to the central system to record the current game meters and accumulate wagers.

FIG. 9 illustrates the processes used to accumulate wagers by currency. The central system accumulates wagers made on each prize by currency and surcharge percent in a matrix for each win number 905A, 905B. The purpose for matrices by win number is explained in the prize award control process. In regards to this illustration it is sufficient to state that each set of meter values or other record of wagering activity is always qualified with the win number 9014, 9015 to point to the correct matrix for the prize.

As the system receives the new game meters 901, it computes the change 902 from the prior game meters value 903 then replaces the prior meter values 903 with the new game meters 901. The gaming device ID 9011, game number 9012 and prize win numbers 9014, 9015 point to entries in the progressive prize to game pay line linkage table 904, to determine the surcharge percent applicable to wagers made for each prize linked to the game. The currency 9016 and the surcharge percents 90451, 90452 are then used to point to a wager accumulator for each prize 9052A, 9052B then the value of wagers made 9023 is used to increment the accumulated wagers 9052A, 9052B.

As this may be a relatively time consuming accumulation process, an independent event process within the event control 112, referring to FIG. 1, maintains a number of poll cycles 2171 and also assigns a specific poll cycle number to each GEM 2023, referring to FIG. 2. The poll cycle numbers are used to condition when the central system requests acquisition data from a GEM. For example, if the number of poll cycles is 10, each GEM would have a poll cycle number in the range of 1 through 10. As the polling process polls all GEMs, each iteration through the list of GEMs is assigned a poll cycle number by incrementing the last poll cycle number. When the increment pushes the poll cycle number greater than the number of poll cycle numbers, it is reset to 1. As each GEM is polled, if the poll cycle number of the GEM is equal to the current poll cycle of the polling process, the GEM is instructed to send acquisition data in response to the poll. Otherwise the GEM sends only the event data. With the number of poll cycles set to 10, if a poll cycle of all GEMs took about 6 seconds to complete, the central system would acquire meter data from all GEMs once every minute (6 seconds*10 poll cycles=60 seconds—or—1 minute).

The independent event process constantly monitors the data acquisition queue containing the data acquired from the GEMs. As the queue grows larger, indicating a backlog of data waiting to be processed, the event process would raise the number of poll cycles, thus lengthening the time for acquiring meter data from all GEMs. As the queue grows smaller, it would lower the number of poll cycles. Each time the number of poll cycles is changed, the independent event process starts with the first GEM, assigning it poll cycle number one. It would continue through the entire list of GEMs, assigning the next poll cycle number to each one so the poll cycle numbers are evenly distributed. This methodology enables spreading the collection of meters over a period of time while ensuring each GEM is polled on a timely basis for events. It also distributes the processing requirements to ensure the central system does not exceed the processing power of the computer it is running on.

FIG. 10 illustrates the process that occurs when changes are made to either the contribution percents, or a currency exchange rate. These changes are initiated within a data maintenance function prior to the central system performing its control process to affect the changes. As the changes are prepared, each link between a game and a prize is evaluated to ensure the linkage is still within the boundaries of acceptance as previously described. Any games becoming unqualified for linkage to a prize are set to a disabled status prior to affecting the changes in percentage factors, surcharge percents or exchange rates.

When any contribution percentage or exchange rate affecting a prize changes, the system converts the accumulated wagers for each affected prize into an amount in the prize's currency. For simplicity, FIG. 10 shows only an increment percent and a currency exchange rate.

When the process starts, each accumulator of wagers associated with the progressive prize 1001 is converted into a monetary amount in the currency of the progressive prize. The computation is:

$$(AW*ER)*(IP+SC)=MA$$

where

AW=accumulated wagers by currency and surcharge percent

ER=exchange rate from wager currency to prize currency

IP=prize's increment percent

SC=surcharge percent

MA=monetary amount in the currency of the prize

This computation is performed on each currency's accumulated wagers 1002. The amount is summed 1003, then used to update the prize's control data 1004 along with the new percentage factors and the accumulated wagers are set to zero 1005. If currency exchange rates have also changed, they are updated 1006. Not illustrated on the diagram is the process of putting all current game meters in a queue for recording to a meter data set for use by the business functionality and reporting processes. This control process is the same as that explained in the end of day process.

As any change in the contribution or exchange rates occur, the surcharge percentage may be affected. As illustrated in FIG. 10, the surcharge percentage changed from 0.00000415979493 to −0.000022941158344. Referring to the previous example in which the exchange rate of 0.7471 and a contribution percentage of 0.02 was used, this example illustrates that the new surcharge percentage works with the exchange rate of 0.7484 and contribution percentage of 0.015 plus the surcharge percentage.

28,571,428.58*0.015=428,571.4287 0.015−0.000022941158344=0.01497705884166

(38,235,158.95*0.7484)*0.01497705884166=428,571.4287

Periodically the system computes the current prize value for display to players. The prize value is always computed in the currency of the prize. The equation used to compute a current prize value is.

$$PA+PI+(\text{sum of }(AW*ER)*(IP+SC))$$

where

PA=the minimum prize amount

PI=prior increment value

AW=accumulated wagers by currency and surcharge percent

ER=exchange rate from wager currency to prize currency

IP=prize's increment percent

SC=surcharge percent

FIG. 11 illustrates the computation process. The minimum prize amount 1101 and prior increment amount 1102 are taken from the prize's control data and added to the sum of all the accumulated wagers 1103 after they are converted to a current increment 1104 monetary value 1106 using the currency exchange rates 1105. The result is the current prize value 1107.

Figure 12:
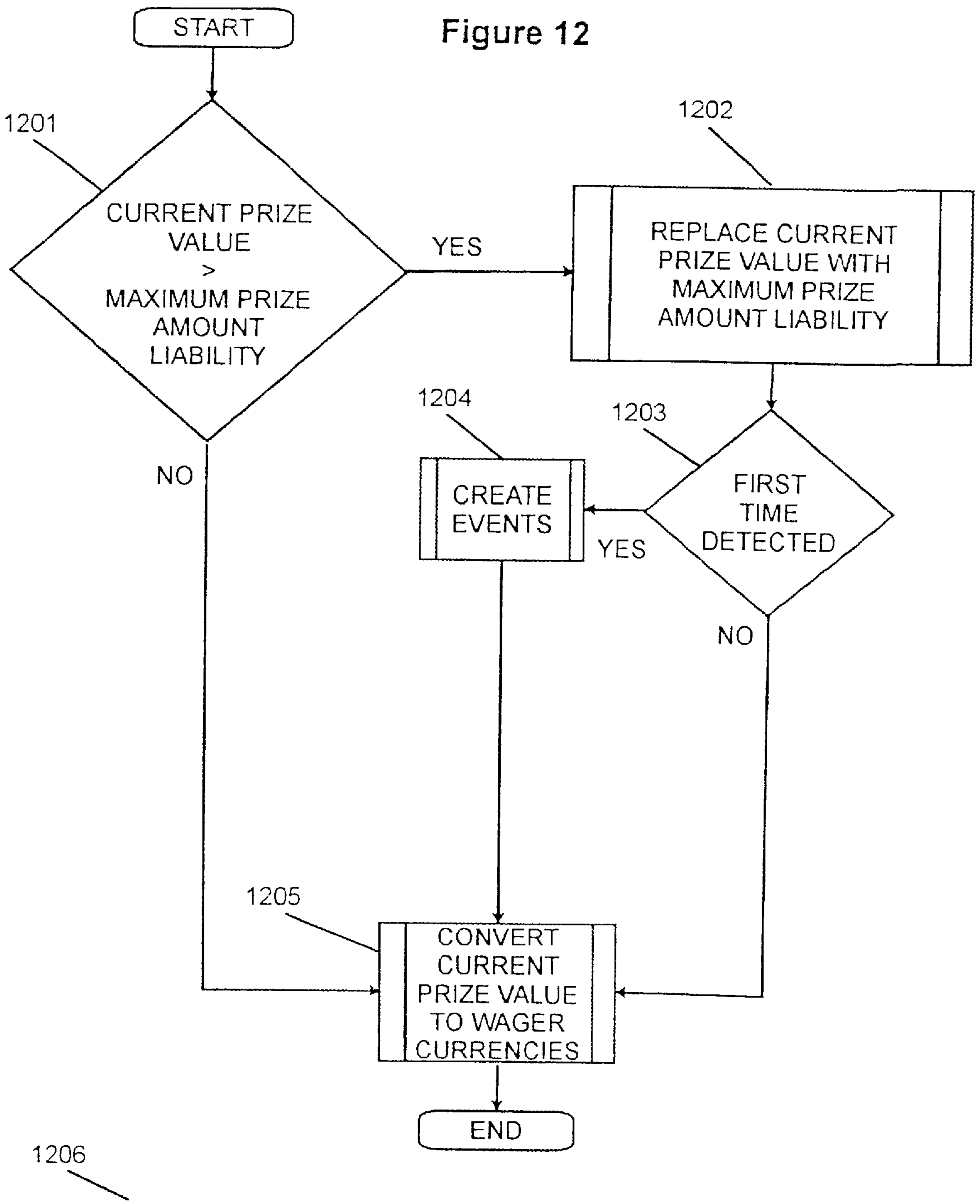
FIG. 12 is a flow chart depicting the decisions used after a prize value has been computed.

Once the current prize value has been computed, it is subjected to checks to ensure it does not exceed the maximum liability for the progressive prize. FIG. 12 contains a flowchart that illustrates the decision processes that occur after the current prize value has been computed. The prize value is compared to the maximum prize amount liability 20910 (referencing FIG. 2) to see if it has exceeded the acceptable limits 1201. If the prize value is greater, then the prize value is changed to the maximum prize amount liability value 1202. If this is the first time this has happened 1203, then an event is generated to inform the system operator 1204.

Once all checks have been made, the prize value is converted to the currency of each wager 1205 and 1206 then sent throughout the system for display to the players. The equation used to convert the prize value is:

$$PV*ER$$

where

PV=the prize value in the prize's currency

ER=exchange rate from prize currency to wager currency

However, one possible embodiment may send the prize value throughout the system for display to the players in the currency used to process the prize. Under this embodiment the prize value would not be subjected to the impact of fluctuations caused by the currency exchange rates.

In prior art progressive gaming systems and methods prize award events occur randomly as a result of the playing of a gaming device. This causes the timing of a prize award event to be unpredictable. However, the process as illustrated in U.S. Pat. No. 5,280,909 uses a randomly generated prize value to condition the prize award event. In essence, when an increment to the current prize value causes that value to meet or exceed the predetermined randomly selected prize value, the central system creates a prize award event associated with the gaming device responsible for the increment that created the condition. However, this condition is also unpredictable when related to the time of the prize award event, or the amount of the prize at the time of award. This process also removes the normal probability, however small, that more than one player may win a particular prize.

This invention introduces an element of predictability into the prize award event to facilitate the creation of progressive prizes associated with certain timed social events or other needs, while retaining the feature of randomly awarded prizes and more than one player winning a particular prize. This is accomplished by setting the operating characteristics 215, referencing FIG. 2, of the prize to establish boundaries that will start a prize award process. In the examples given in FIG. 2, a boundary for end time 2156 could be set, or when the prize value exceeds the maximum prize value 2157 could be set for a prize. When a condition is met, such as the current date and time meets the expiration date and time, or the prize value meeting or exceeding the maximum prize value, the central system creates one or more messages to the GEMs participating in the prize. This message creates an event on each GEM. The event monitors each device driver to select the gaming device with the first detected handle pull or other play within a specified time period, a preferred time period being one second in duration. If play is detected, the event instructs the device driver to create a prize award for that device. If play is not detected within the specified time period, the event is terminated.

Once the central system receives a prize award message it performs the normal prize award process as described further on. If a GEM receives notification of a prize reset for the prize before a handle pull or other play of a linked gaming device is detected, it terminates the event monitoring handle pull activity and performs the normal prize award process.

If the central system does not receive a prize award message after a specified time, a preferred time period being two poll cycles, it would repeat the process of sending messages to the GEMs. This process would continue to iterate until a prize is awarded to at least one player.

To enable the central control processes to isolate the activity associated with each prize award event, each progressive prize award event is identified with a unique win number. The win number is disseminated down to the device driver level. The device driver assigns the current win number of each progressive prize linked to the progressive pay lines of each gaming device's games to all meter values reported by the gaming devices. As previously described, the central system receives the meters and accumulates the wagers made by currency and surcharge percent. When a gaming device generates a prize award event, it sends a prize award message to the device driver. The device driver formats a system prize award message and sends it to the central system.

Communication line failures may prevent the award message from reaching the central system. In this case, manual procedures must be followed to inform the central system operators that a prize award has been generated. The central system operator would then start a prize award event from the operator console. The information entered would be used to create a prize award message. As a safeguard, the system would require the operator to enter a manual win reset code 2113 associated with the win number of the award.

Figure 13:
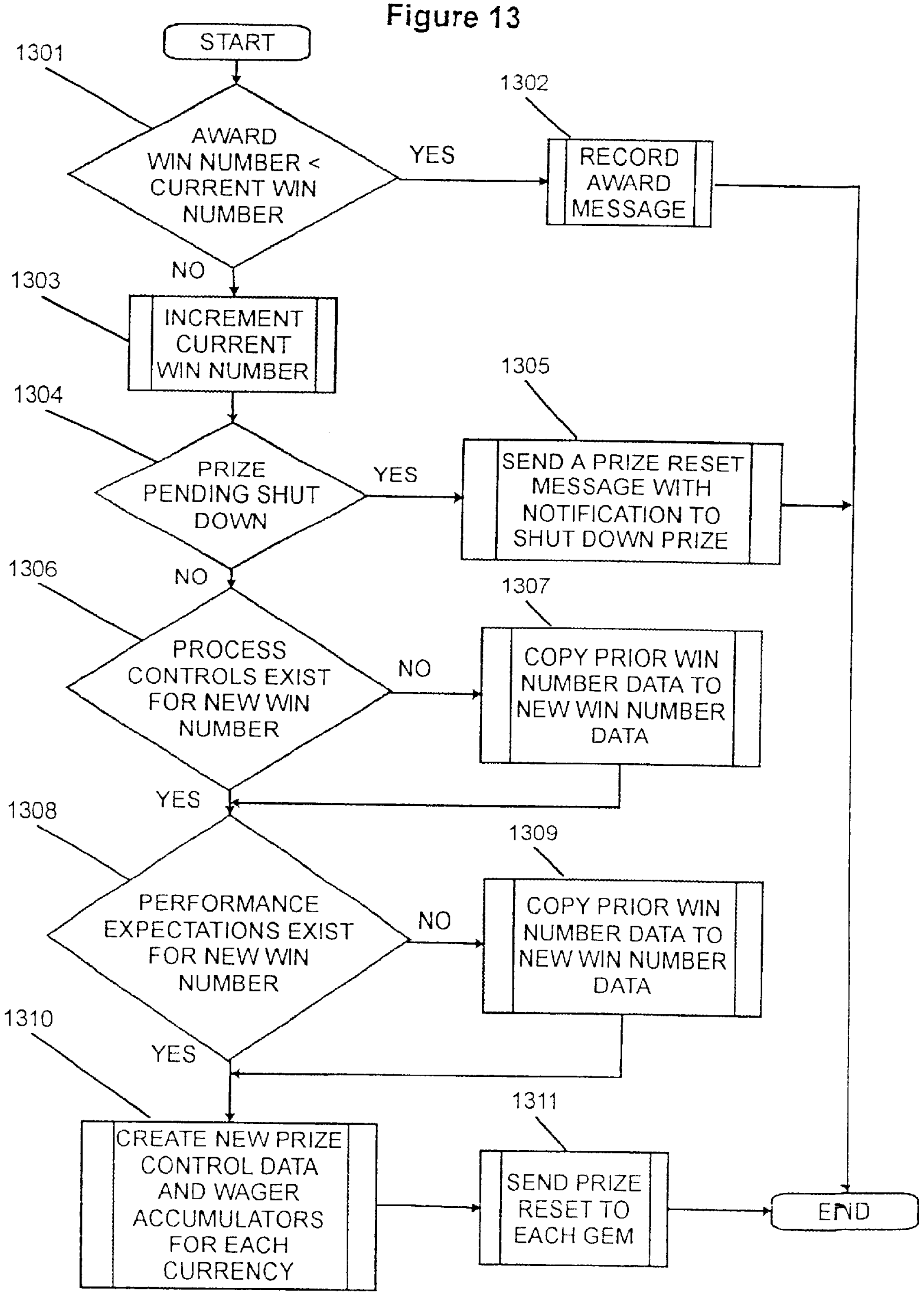
FIG. 13 is a flow chart depicting the decisions used to process a prize award event.

FIG. 13 contains a flowchart that describes the processes that occur when the central system starts the prize award process. The prize award's win number is compared to the current win number for the progressive prize 1301. If the win number is less than the current win number then the prize award message is for a previous prize. In this case the prize award message is recorded then sent to the business function for processing 1302.

If the win number is not less than the current win number then the prize award is for the current prize. The process then increments the win number 1303. At this point the process checks to see if the progressive prizes status 2093 is set to pending shut down 1304. If it is, then the prize reset message, with a logical flag instructing all device drivers to close the progressive prize processing for this prize, is sent to all device drivers controlling gaming devices linked to the progressive prize 1305.

If the progressive prize is to continue, the process checks to see if the owners of the prize have set up new progressive processing controls 211 to be implemented when the win number is reached 1306. If no progressive processing controls exist for the new win number then a new set of data is created by copying the data from the old win number 1307. If the owners have not set up new performance expectations 210 data for the new win number 1308, then a new set of data is created by copying the data from the old win number 1309.

The progressive processing controls 211 and performance expectations 210 data are used to create the control data and wager accumulation data areas for processing the new win number 1310. The progressive control process is now ready to process wagers for the new win number. It starts the new win number by sending the prize reset message to all device drivers controlling gaming devices linked to the progressive prize 1311.

As each device driver receives the prize reset message, it notifies the gaming device of the new prize value. If the gaming device responds with confirmation that it has changed the prize value, then the gaming device's meters are sent to the central system with the old win number. If the gaming device responds with a prize hit message, then the device driver formats both a prize hit message and the meter message using the old win number and sends both messages to the central system. The win number associated with the gaming device is then incremented. As each device driver will receive the reset message at different times, and the time taken to reset the device will vary depending on conditions such as the gaming device being in a state of playing a game, there will be meter messages for the same prize received by the central system with different win numbers.

Figure 14:
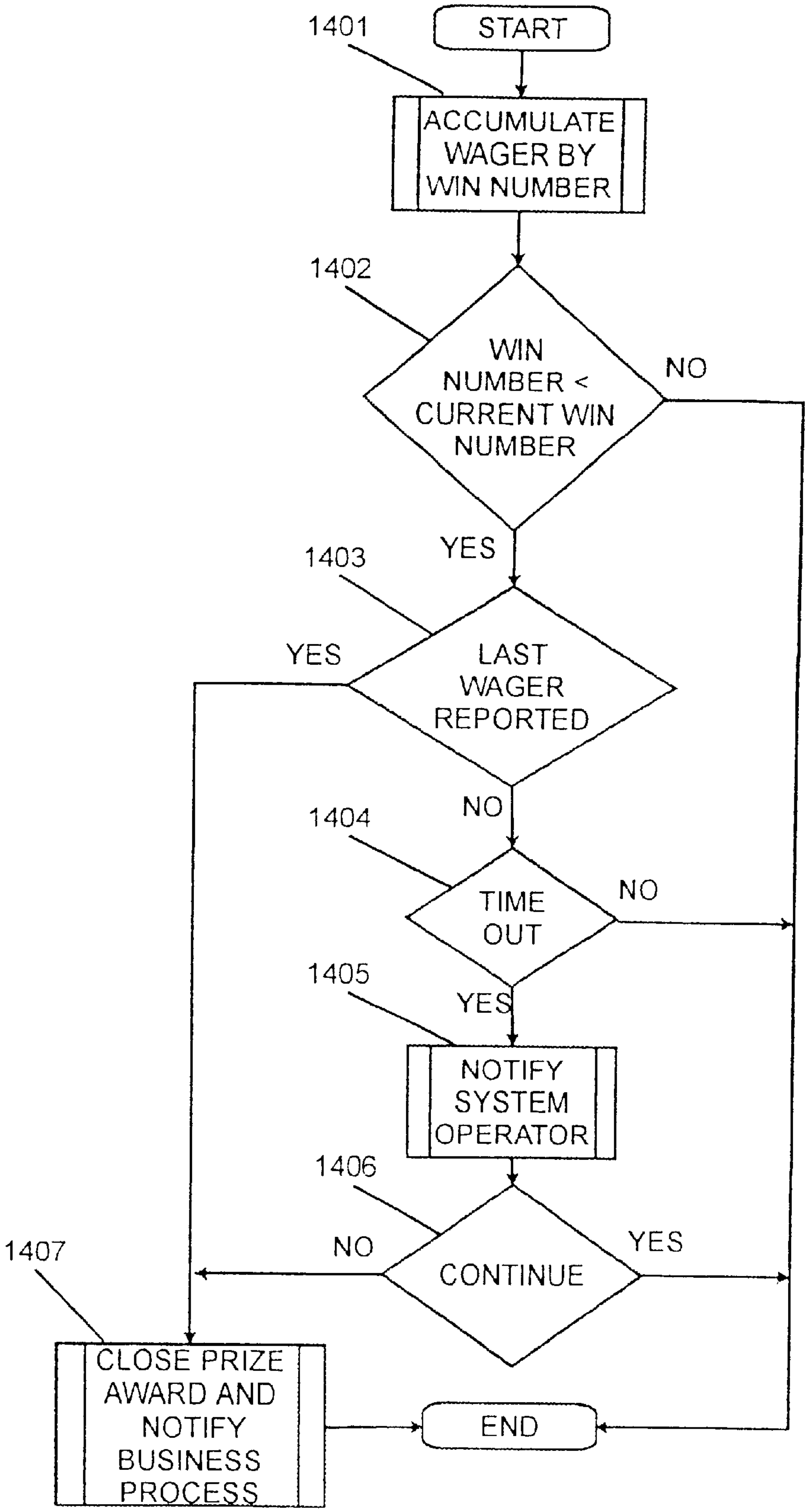
FIG. 14 is a flow chart depicting the wager accumulation process as it relates to prize award processes.

FIG. 14 describes the processes that occur when wagers for a prize are being reported under more than one win number. As the previously described process accumulates wagers 1401, it checks the progressive prize's win number associated with the meter data against the current win number 1402. If the win number is less than the current win number then the meters are for a prize award. In this case a check is made to see if the meter data is the last to be reported 1403. If this is the last meter data for the prize award, then the prize award is closed and the business process is notified 1407. If the meter data was not the last, then a check is made to see if the time allocated to performing the prize award has been exceeded 1404. If this is the case, the system operator is notified 1405 of the devices that have not reported. The system operator makes the decision 1406 to either continue the prize process or proceed to close the prize award process 1407.

Each location may be physically sited in wide ranging geographical locations spanning a plurality of international time zones. The owner of each location determines the open and close times, holiday schedules and the time of day used to transition business days. The central system uses the open and close times and holiday schedules to notify each GEM at the location to set the attached gaming devices to an open or closed status.

When a location's time for end of day is reached, the central system notifies each GEM at the location to send the current meters for end of day. When the meters are received, they are sent to the business functions to process the location's end of day. The use of device drivers to monitor and control gaming devices eliminates the chance of bad meter data entering into the system. Each gaming device will have the limits of normal operating criteria defined that will enable its device driver to detect invalid meters and runaway conditions before they get into the system data. In the event invalid meters or runaway conditions are detected, the device driver will disable the offending gaming device and notify the central system via a generated event message. This eliminates the often labor intensive tasks normally associated with correcting meter data and the need to protect against a runaway gaming device driving the progressive prize value to an excessive value.

SUMMARY

This invention introduces control processes based on the total wager amount. These control processes provide the ability to support international participation for common progressive prizes. Players in each participating gaming location place wagers in the currency common to the location. The currency used to control the prize may be different from the currency used to wager for the prize. Currency exchange rates enable linkage between games and prizes to be established in accordance with the rules and regulations of regulatory agencies that ensure fairness to all players. The currency exchange rates are used to compute prize values from accumulated wagers and display prizes values to participating players.

This invention's ability to monitor and control the very large number of gaming devices and progressive prizes anticipated, depends on the control methods provided by the device driver, win number and poll cycles.

The ability to react quickly and economically as currency exchange rates fluctuate is provided by the Free Play apparatus. As currency exchanges rates change, the total wager amount as known to the Free Play apparatus is changed. As this occurs, the odds as computed by the Free Play apparatus will change ensuring all players continue making the same monetary investment for the prize award as represented in the currency used to control the prize.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of operating a progressive wagering system, comprising:

(A) determining a total wager amount for a progressive prize;

(B) recording the progressive prize's total wager amount;

(C) providing a free play apparatus;

(D) linking the progressive prize to the free play apparatus; and (E) communicating the progressive prize's total wager amount to the free play apparatus.

2. The method of claim 1 wherein the total wager amount for the progressive prize is the theoretical sum of all wagers made for each prize award event.

3. The method of claim 1 further comprising defining a prize winning number.

4. The method of claim 1 wherein the free play apparatus is adapted to compute the odds of a handle pull generating a prize award event using the prize's total wager amount and a player's wager amount, the odds having a range of numbers.

5. The method of claim 4 wherein the free play apparatus is further adapted to generate a random number within the range of numbers.

6. The method of claim 5 wherein the free play apparatus is further adapted to compare the generated random number to the prize winning number.

7. The method of claim 6 further comprising the step of generating a prize award event if the generated random number is equal to the prize winning number.

8. A progressive gaming system, comprising:

(A) a central system, the central system being adapted to record a total wager amount for a progressive prize;

(B) at least one gaming device, the gaming device being adapted to accept wagers from a player and allow a player to play a game; and (C) at least one free play apparatus in communication with the central system and the gaming device, the free play apparatus being adapted to:

(a) store a predefined prize winning number;

(b) receive the total wager amount from the central system;

(c) receive information from the gaming device indicating the player has placed a wager in the gaming device;

(d) compute the odds of the player winning the progressive prize, the odds having a range of numbers;

(e) generate a random number within the range of numbers;

(f) compare the generated random number to the prize winning number; and (g) generate a prize award event if the generated random number is equal to the prize winning number.

9. The system of claim 8 wherein the total wager amount for the progressive prize is the theoretical sum of all wagers made for each prize award event.

10. The system of claim 8 wherein the free play apparatus computes the odds of the player winning the progressive prize by dividing the total wager amount by an amount of the wager.

11. A method of awarding a progressive prize, comprising:

(A) defining a prize winning number;

(B) determining a total wager amount for a progressive prize;

(C) allowing a player to place a wager, the wager having an amount;

(D) computing the odds of a handle pull generating a prize award event using the total wager amount and the amount of the wager, the odds having a range of outcomes, the prize winning number being within the range of outcomes;

(E) generating a random number within the range of outcomes;

(F) comparing the generated random number to the prize winning number; and (G) awarding the progressive prize to the player if the generated random number is substantially equal to the prize winning number.

12. The method of claim 11 wherein the total wager amount for the progressive prize is the theoretical sum of all wagers made for each prize award event.

13. The method of claim 11 wherein computing the odds of a handle pull generating a prize award event comprises dividing the total wager amount by the amount of the wager.

14. The method of claim 11 further comprising providing a free play apparatus, the free play apparatus being adapted to perform at least (E).

15. The method of claim 11 wherein the free play apparatus is further adapted to perform at least (F).

16. A free play apparatus for allowing a player to play for a progressive prize, comprising:

(A) at least one communication device, the communication device being adapted to allowing the free play apparatus to communicate with other devices;

(B) at least one processor, the processor being adapted to perform at least the following:

(a) store information about a progressive prize, including total wager amount;

(b) store a predefined prize winning number;

(c) receive information from a gaming device indicating the player has placed a wager;

(d) compute the odds of the player winning the progressive prize, the odds defining a range of numbers;

(e) generate a random number within the range of numbers;

(f) compare the generated random number to the prize winning number; and (g) generate a prize award event if the generated random number is substantially equal to the prize winning number; and (C) a display device, the display device being adapted to inform the player when the player has won the progressive prize.

17. The free play apparatus of claim 16 wherein the free play apparatus enables a player to select a prize from a plurality of prizes.

* * * * *